United States Patent
Combs et al.

(10) Patent No.: US 12,332,264 B2
(45) Date of Patent: Jun. 17, 2025

(54) DISPOSABLE PIPETTE TIP MANAGEMENT

(71) Applicant: Gen-Probe Incorporated, San Diego, CA (US)

(72) Inventors: David H Combs, San Diego, CA (US); Norbert D. Hagen, Carlsbad, CA (US); Ayra Baker, Escondido, CA (US); Joseph Reed Ellis, Solana Beach, CA (US)

(73) Assignee: GEN-PROBE INCORPORATED, San Diego, CA (US)

( * ) Notice: Subject to any disclaimer, the term of this patent is extended or adjusted under 35 U.S.C. 154(b) by 814 days.

(21) Appl. No.: 17/599,273

(22) PCT Filed: Mar. 19, 2020

(86) PCT No.: PCT/US2020/023641
§ 371 (c)(1),
(2) Date: Sep. 28, 2021

(87) PCT Pub. No.: WO2020/205264
PCT Pub. Date: Oct. 8, 2020

(65) Prior Publication Data
US 2022/0187331 A1    Jun. 16, 2022

Related U.S. Application Data

(60) Provisional application No. 62/826,599, filed on Mar. 29, 2019.

(51) Int. Cl.
*B01L 3/00*    (2006.01)
*B01F 33/302*    (2022.01)
(Continued)

(52) U.S. Cl.
CPC .......... *G01N 35/10* (2013.01); *G01N 35/021* (2013.01); *G01N 2035/00277* (2013.01); *G01N 2035/0434* (2013.01); *G01N 2035/103* (2013.01)

(58) Field of Classification Search
CPC ................. G01N 35/10; G01N 35/021; G01N 2035/00277; G01N 2035/0434; G01N 2035/103; G01N 35/04
See application file for complete search history.

(56) References Cited

U.S. PATENT DOCUMENTS 4,363,781 A    12/1982    Akamatsu et al.
8,992,833 B2    3/2015    Blecka et al.
(Continued)

FOREIGN PATENT DOCUMENTS

EP    3441143 A1    2/2019
JP    2000-019182 A    1/2000
(Continued)

OTHER PUBLICATIONS

International Search Report and Written Opinion dated Jun. 5, 2020 in International Patent Application No. PCT/US2020/023641 (11 pages total).
(Continued)

*Primary Examiner* — Jennifer Wecker
*Assistant Examiner* — Oyeleye Alexander Alabi
(74) *Attorney, Agent, or Firm* — Richard Wydeven, Rothwell, Figg, Ernst & Manbeck, P.C.; Charles B. Cappellari

(57) ABSTRACT

After disposable pipette tips are used by an automated pipettor, they are released by the pipettor and fall into a waste container. When the waste container is removed to be emptied, the pipette tips are temporarily sequestered in a pipette tip holding station so that the automated pipettor may (Continued)

operate uninterrupted. After the waste container is replaced, the sequestered pipette tips are released by the holding station into the waste container.

19 Claims, 18 Drawing Sheets

(51) Int. Cl.
*B01F 33/3033* (2022.01)
*B01L 7/00* (2006.01)
*C12Q 1/6848* (2018.01)
*C12Q 1/686* (2018.01)
*G01N 21/29* (2006.01)
*G01N 35/02* (2006.01)
*G01N 35/10* (2006.01)
*G01N 35/00* (2006.01)
*G01N 35/04* (2006.01)

(56) References Cited

U.S. PATENT DOCUMENTS

| | | | |
|---|---|---|---|
| 9,285,262 B2 | 3/2016 | Kneubuehl et al. | |
| 9,897,621 B2 | 2/2018 | Andersson et al. | |
| 2003/0031542 A1* | 2/2003 | Hamel | G01N 35/10 414/331.05 |
| 2003/0129089 A1* | 7/2003 | Arnold, Jr. | G01N 35/10 422/526 |
| 2005/0249642 A1 | 11/2005 | Okun et al. | |
| 2007/0189924 A1 | 8/2007 | Knight | |
| 2009/0081081 A1 | 3/2009 | Kowari et al. | |
| 2015/0147820 A1 | 5/2015 | Fritchie | |
| 2016/0139163 A1 | 5/2016 | Gisler et al. | |
| 2018/0143215 A1 | 5/2018 | Chang et al. | |
| 2018/0265288 A1 | 9/2018 | Huber et al. | |
| 2019/0041302 A1 | 2/2019 | Hunt et al. | |

FOREIGN PATENT DOCUMENTS

| | | | |
|---|---|---|---|
| JP | 2005-233829 A | 9/2005 | |
| JP | 2006-094732 A | 4/2006 | |
| JP | 2007-017211 A | 1/2007 | |
| JP | 2007-198728 A | 8/2007 | |
| WO | 2002040870 A1 | 5/2002 | |
| WO | 2006075201 A1 | 7/2006 | |
| WO | 2017/184244 A1 | 10/2017 | |
| WO | 2017184242 A2 | 10/2017 | |
| WO | 2018017771 A1 | 1/2018 | |
| WO | 2018206849 A1 | 11/2018 | |
| WO | 2019018152 A1 | 1/2019 | |

OTHER PUBLICATIONS

IPA Examination report No. 1, Australian Application No. 2020253774, Oct. 26, 2022.
CIPO Notice of Allowance, Canadian Application No. 3,134,556, Apr. 27, 2022.
EPO Examination Report, European Application No. 20719842.5, Sep. 16, 2022.
JPO Office Action, Japanese Patent Application No. 2021-557897, Feb. 10, 2023.
CIPO Examination Report, Canadian Application No. 3,134,556, Dec. 1, 2021.
CNIPA First Office Action, Chinese Patent Application No. 2020800243261, Aug. 27, 2024.
CNIPA Search Report, Chinese Patent Application No. 2020800243261, Aug. 9, 2024.

* cited by examiner

DISPOSABLE PIPETTE TIP MANAGEMENT

CROSS REFERENCE TO RELATED APPLICATION(S)

This application is a 35 U.S.C. § 371 National Stage of International Patent Application No. PCT/US2020/023641, filed Mar. 19, 2020, and claims the benefit under 35 U.S.C. § 119(e) of the filing date of provisional patent application Ser. No. 62/826,599 filed Mar. 29, 2019, the disclosure of which is incorporated herein by reference.

FIELD OF THE DISCLOSURE

This disclosure relates to handling discarded, disposable pipette tips within an instrument employing a robotic pipettor.

BACKGROUND

Certain instruments, such as diagnostic and clinical analyzers, in which liquids are transferred to, from, or between different receptacles, reservoirs, or other liquid-containing vessels, often employ robotic pipettors to aspirate and dispense liquids. To prevent contamination of a probe of the pipettor, disposable pipette tips can be removably attached to the probe of the pipettor so that liquid is aspirated into the pipette tip without contacting the probe. After the pipette tip has been used, it is typically discarded by releasing or ejecting it from the pipettor probe over a waste container into which the released pipette tip falls. Periodically, over the course of a sustained operation of the instrument, the waste container must be emptied as it becomes filled with discarded pipette tips. Typically, the waste container is emptied by removing it from the instrument and disposing of the accumulated pipette tips before replacing the waste container into the instrument. During the time that the waste container is removed from the instrument, however, operation of the instrument must be suspended, as there is no place to discard pipette tips released from the pipettor probe. Having to suspend operation of the instrument each time a waste container must be emptied can have a negative impact on the instrument's throughput.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

Aspects of the disclosure are embodied in a device to capture one or more pipette tips that are released from an automated pipettor at a tip release location. The device may include a tip holder conveyor, a drive mechanism, and a tip ejector. The tip holder conveyor may include or support a plurality of tip holders, where each tip holder may be configured to receive and releasably hold a single pipette tip. The drive mechanism is configured to index the tip holder conveyor to sequentially place each of one or more of the plurality of tip holders in the tip release location to receive a pipette tip released by the automated pipettor into each tip holder placed at the tip release location. The tip ejector may be positioned to engage a pipette tip held in each of one or more of the plurality of tip holders when the tip holder conveyor is moved by the drive mechanism with respect to the tip ejector, where the tip ejector is configured to remove each pipette tip that it engages from an associated tip holder.

According to other aspects, the plurality of tip holders of the tip holder conveyor may be interconnected to form a tip holder chain.

According to other aspects, the tip holder chain may include a continuous chain guided by a continuous track.

According to other aspects, after a pipette tip is released by the automated pipettor into the tip holder located at the tip release location, if at least one of the plurality of tip holders has not received a pipette tip released by the automated pipettor, the drive mechanism may index the tip holder conveyor to index a following tip holder to the tip release location.

According to other aspects, pipette tips released from the automated pipettor may drop into a removable waste container positioned to receive the released pipette tips when there is no tip holder located at the tip release location. The device may further include a waste container sensor configured to detect if the waste container is positioned to receive the released pipette tips. Detection by the waste container sensor that the waste container is not positioned to receive the released pipette tips may cause the drive mechanism to index the tip holder conveyor to sequentially position each of the one or more tip holders at the tip release location to capture each pipette tip released while the waste container is not positioned to receive the released pipette tips. Detection by the waste container sensor that the waste container is positioned to receive the released pipette tips may cause the drive mechanism to move the tip holder conveyor to sequentially move each of the one or more tip holders with respect to the tip ejector to remove the pipette tips from the associated tip holders at a tip removal location.

According to other aspects, the device may further include a waste chute positioned beneath the tip release location and beneath the tip removal location, and the waste chute may be configured to direct pipette tips released by the automated pipettor or pipette tips removed from tip holders of the tip holder conveyor into the waste container.

According to other aspects, the drive mechanism may be configured to move the tip holder conveyor to a standby position at which no tip holder is located at the tip release location when the waste container sensor detects that the waste container is positioned to receive the released pipette tips.

According to other aspects, as the tip holder conveyor is moved to the standby position, each tip holder holding a pipette tip may be sequentially moved with respect to the tip ejector to remove the pipette tip from the associated tip holder, so that no pipette tips are held by the tip holder conveyor when the tip holder conveyor is in the standby position.

According to other aspects, the tip holder conveyor may include a tip holder chain comprising a plurality of interconnected links, and each tip holder may be part of one of the links.

According to other aspects, the tip holder conveyor may include a detect element at each tip holder, and the device may further include a sensor for detecting each detect element that passes the sensor as the drive mechanism moves the tip holder conveyor.

According to other aspects, the tip holder conveyor may include a tip holder chain comprising a plurality of interconnected links, each tip holder may be part of one of the links, and each detect element may include a pin connecting one link to an adjacent link.

According to other aspects, the device may further include a controller configured to determine the position of the tip holder chain based on the number of detect elements that have passed the sensor.

According to other aspects, the tip holder chain may include a continuous chain guided by a continuous track.

According to other aspects, the drive mechanism may include a chain drive comprising a motorized wheel, and the continuous chain is trained around the motorized wheel.

According to other aspects, each tip holder may include a clip defining an opening configured to receive a pipette tip without any resistance.

According to other aspects, each clip may include opposed arms configured to hold a pipette tip therebetween and defining a lateral opening that is less than the width of a portion of the pipette tip held between the opposed arms.

According to other aspects, the tip ejector may include one or more ramps, or wedges, that contact a pipette tip held in the opening of the clip as the tip holder passes by the tip ejector, and the opposed arms are flexible so that as the one or more ramps contact the pipette tip, the pipette tip is moved laterally and urges the opposed arms apart to enlarge the lateral opening and permit the pipette tip to pass through the lateral opening and be removed from the tip holder.

According to other aspects, the tip holder conveyor may follow a curved path adjacent the tip ejector.

According to other aspects, the tip ejector may include first and second laterally extending ramps, or wedges, the first laterally extending ramp may be configured to engage a first portion of the pipette tip extending above the clip as the tip holder moves with respect to the tip ejector, and the second laterally extending ramp may be configured to engage a second portion of the pipette tip extending below the clip as the tip holder moves with respect to the tip ejector.

According to other aspects, the drive mechanism may be configured to move the tip holder conveyor in a first direction to sequentially place each tip holder at the tip release location and may be configured to move the tip holder conveyor in a second direction opposite the first direction to move the tip holder conveyor with respect to the tip ejector to remove the pipette tips from the associated tip holders.

According to other aspects, at least a portion of the tip holder conveyor may follow a linear path when moving in the first and second directions.

Aspects of the disclosure are embodied in an instrument comprising a pipettor, a waste container, and a pipette tip holder. The pipettor may be configured for lateral and vertical movement in the instrument, the pipettor having a mounting end adapted to receive a pipette tip in a frictional fit. The waste container is moveable between a first receptacle position and a second receptacle position. The waste container is positioned to receive a pipette tip released from the mounting end of the pipettor at a tip release location when the waste container is in the first receptacle position, and the waste container is not positioned to receive a pipette tip released from the mounting end of the pipettor at the tip release location when the waste container is in the second receptacle position. The pipette tip holder is moveable between a first tip holder position and a second tip holder position. In the first tip holder position, the pipette tip holder is not positioned to receive a pipette tip released from the mounting end of the pipettor at the tip release location when the waste container is in the first receptacle position. In the second tip holder position, the pipette tip holder is positioned to receive and hold a pipette tip released from the mounting end of the pipettor at the tip release location when the waste container is in the second receptacle position.

According to other aspects, the pipettor may be configured for X, Y, and Z movement.

According to other aspects, the pipettor may include a probe, and the mounting end may include a distal end of the probe.

According to other aspects, the instrument may further include a pipette tip holder bay and a container of pipette tips disposed within the pipette tip holder bay, and the pipette tips in the container within the pipette tip holder bay are positioned and oriented to be engaged by the mounting end of the pipettor.

According to other aspects, the pipette tip holder may be movable to a third tip holder position different than the second tip holder position where a pipette tip held in the pipette tip holder is removed from the pipette tip holder.

According to other aspects, the instrument may further include a tip ejector configured to remove the pipette tip from the pipette tip holder at the third position.

According to other aspects, the pipette tip may be laterally displaced from the pipette tip holder by the tip ejector.

According to other aspects, movement of the pipette tip holder from the first tip holder position to the second tip holder position may be in a first lateral direction, and movement of the pipette tip holder from the second tip holder position to the third tip holder position may be in a second lateral direction, where the first and second lateral directions are opposite directions.

According to other aspects, the waste container may be lined with a disposable plastic bag.

According to other aspects, the instrument may further include a drawer supporting the waste container and configured to move the waste container laterally between the first and second receptacle positions.

According to other aspects, the instrument may further include a sensor for sensing when the waste container is in at least one of the first and second receptacle positions.

According to other aspects, the pipette tip holder may be carried on a conveyor.

According to other aspects, the device may include a track for supporting the conveyor.

According to other aspects, the device may further include a sensor for monitoring the position of the pipette tip holder on the track.

According to other aspects, the device may further include a drip tray situated beneath a portion of the conveyor.

According to other aspects, the pipette tip holder may be one of a plurality of pipette tip holders.

According to other aspects, a pipette tip is released into the waste container when the pipette tip holder is not in the second tip holder position for receiving the pipette tip released from the mounting end of the pipettor at the tip release location and the waste container is in the first receptacle position.

According to other aspects, the pipette tip may be released into a chute that directs the pipette tip into the waste container when a pipette tip holder is not in the second tip holder position for receiving the pipette tip released from the mounting end of the pipettor at the tip release location and the waste container is in the first receptacle position.

According to other aspects, the tip holder may include a clip defining an opening configured to receive a pipette tip without any resistance.

According to other aspects, the clip may include opposed arms configured to hold a pipette tip therebetween and defining a lateral opening that is less than the width of a portion of the pipette tip held between the opposed arms.

According to other aspects, the pipettor may include a tip release mechanism for releasing the pipette tip from the mounting end of the pipettor.

According to other aspects, the tip release mechanism may include a release sleeve coaxially mounted over the mounting end and configured to be movable in an axial direction with respect to the mounting end.

According to other aspects, the tip release mechanism may further include a release trigger coupled to the release sleeve and configured to cause the release sleeve to move axially with respect to the mounting end to release a pipette tip from the mounting end when the pipettor moves the release trigger into contact with a release surface.

Aspects of the disclosure are embodied in a method for capturing one or more pipette tips that are released from an automated pipettor. The method may include the steps of a) repeatedly moving the pipettor with a pipette tip secured thereto laterally to a tip release position and releasing the pipette tip from the pipettor, whereby the released pipette tip drops into a waste container positioned to receive the released pipette tip, b) detecting if the waste container is no longer positioned to receive a pipette tip released from the pipettor at the tip release position, and c) upon detecting that the waste container is no longer positioned to receive a pipette tip released from the pipettor at the tip release position, moving a pipette tip holder from a first tip holder position in which the pipette tip holder is not positioned to receive a pipette tip released from the pipettor at the tip release position to a second tip holder position at which the pipette tip holder is positioned to receive a pipette tip released from the pipettor at the tip release position, and receiving a pipette tip released from the pipettor with the pipette tip holder at the second tip holder position.

According to other aspects, the method may further include the steps of d) while the waste container is no longer positioned to receive a pipette tip released from the pipettor at the tip release position, moving additional pipette tip holders from the first tip holder position in which the pipette tip holder is not positioned to receive a pipette tip released from the pipettor at the tip release position to the second tip holder position at which the pipette tip holder is positioned to receive a pipette tip released from the pipettor at the tip release position, and e) receiving the pipette tip released from the pipettor with an associated pipette tip holder at the second tip holder position.

According to other aspects, step b) is performed with a sensor for detecting the presence or absence of the waste container.

According to other aspects, the method may further include, after step c), the steps of f) upon detecting that the waste container is positioned to receive a pipette tip from the pipettor at the tip release position, moving the pipette tip holder from the second tip holder position to a third tip holder position that is different from the second tip holder position, and g) at the third tip holder position, removing a pipette tip from the pipette tip holder, whereby the removed pipette tip drops into the waste container.

According to other aspects, step g) may include moving the pipette tip holder with respect to a tip ejector comprising at least one ramp that engages a pipette tip held in the tip holder and displaces the pipette tip laterally out of the tip holder.

According to other aspects, a plurality of tip holders are interconnected to form a continuous tip holder chain, and step f) may include moving the tip holder chain with a motorized drive wheel engaged with the tip holder chain.

According to other aspects, step c) may include moving the pipette tip holder in a first lateral direction, and step f) may include moving the pipette tip holder in a second lateral direction, where the first and second lateral directions are opposite directions.

According to other aspects, the method may further include the step of h) monitoring a position of the pipette tip holder.

According to other aspects, the method may further include the steps of i) determining that no pipette tip holders without a pipette tip are available, and j) interrupting operation of the pipettor when no pipette tip holders without a pipette tip are available.

According to other aspects, releasing the pipette tip from the pipettor may include engaging a pipette tip attached to the pipettor with a tip release mechanism.

According to other aspects, the tip release mechanism may include a release sleeve coaxially mounted over a mounting end of the pipettor on which the pipette tip is attached, and engaging the pipette tip with the tip release mechanism may include moving the release sleeve in an axial direction with respect to the mounting end.

According to other aspects, the tip release mechanism may further include a release trigger coupled to the release sleeve and moving the release sleeve axially with respect to the mounting end may include contacting a release surface with the release trigger.

Aspects of the disclosure are embodied in a method for facilitating the uninterrupted processing of a plurality of samples in an automated system. The method may include the steps of a) detecting that a waste container of the system is not in a pipette tip-receiving position, b) after step a), and while the waste container is not in the pipette tip-receiving position, sequestering one or more pipette tips released from a pipettor in a pipette tip holding station of the system, where the sequestered pipette tips have been previously used for the processing of at least a subset of the plurality of samples in the system, and where any pipette tips used in the processing of the plurality of samples and released from the pipettor when the waste container is in the pipette tip-receiving position may be released directly into the waste container, c) after step b), detecting that the waste container is in the pipette tip-receiving position, and d) after step c), and while the waste container is in the pipette tip-receiving position, transferring the sequestered pipette tips from the pipette tip holding station to the waste container. The processing of the plurality of samples in the system is uninterrupted during steps a) to d).

According to other aspects, the waste container is supported by a drawer that is movable in a lateral direction to or from the pipette tip-receiving position.

According to other aspects, the waste container may be lined with a disposable plastic bag.

According to other aspects, steps a) and b) include detecting when the waste container is or is not in the pipette tip-receiving position using a positional sensor of the system.

According to other aspects, step b) may include, for each of the one or more pipette tips, moving the pipettor into engagement with a pipette tip release surface of the holding station, thereby causing the pipettor to release the associated pipette tip from a mounting end of the pipettor.

According to other aspects, the one or more pipette tips may be released into individual pipette tip holders at a first tip release location in step b), where the individual pipette tip holders are contained within the pipette tip holding station when the waste container is not in the pipette tip-receiving position.

According to other aspects, the pipette tip holders may support the one or more pipette tips in an upright orientation.

According to other aspects, the individual pipette tip holders include or are supported by a looped conveyor of the pipette tip holding station.

According to other aspects, the individual pipette tip holders may be moved in a first lateral direction on the conveyor during step b) and in a second lateral direction on the conveyor in step d), where the first lateral direction and the second lateral direction are opposite directions.

According to other aspects, step d) may include laterally displacing the one or more pipette tips from the individual pipette tip holders.

According to other aspects, the method may further include the step of releasing at least one pipette tip from the pipettor at a second tip release location when the waste container is in the pipette tip-receiving position.

According to other aspects, the first and second tip release locations may be the same tip release location.

According to other aspects, the first and second tip release locations may be situated above a chute for directing pipette tips to the waste container.

According to other aspects, the method may further include the step of collecting a residual fluid dislodged from at least one of the one or more pipette tips in a tray disposed beneath the one or more pipette tips sequestered in the holding station in step b), where the tray is a component of the holding station.

According to other aspects, the processing of at least a subset of the plurality of samples may include reconstituting or transferring a reagent for performing a nucleic acid-based amplification reaction.

According to other aspects, the processing of at least a subset of the plurality of samples may include forming a reaction mixture comprising one of the samples and at least one reagent for performing a nucleic acid-based amplification reaction.

Other features and characteristics of the subject matter of this disclosure, as well as the methods of operation, functions of related elements of structure and the combination of parts, and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The accompanying drawings, which are incorporated herein and form part of the specification, illustrate various embodiments of the subject matter of this disclosure. In the drawings, like reference numbers indicate identical or functionally similar elements.

DETAILED DESCRIPTION

Figure 1:
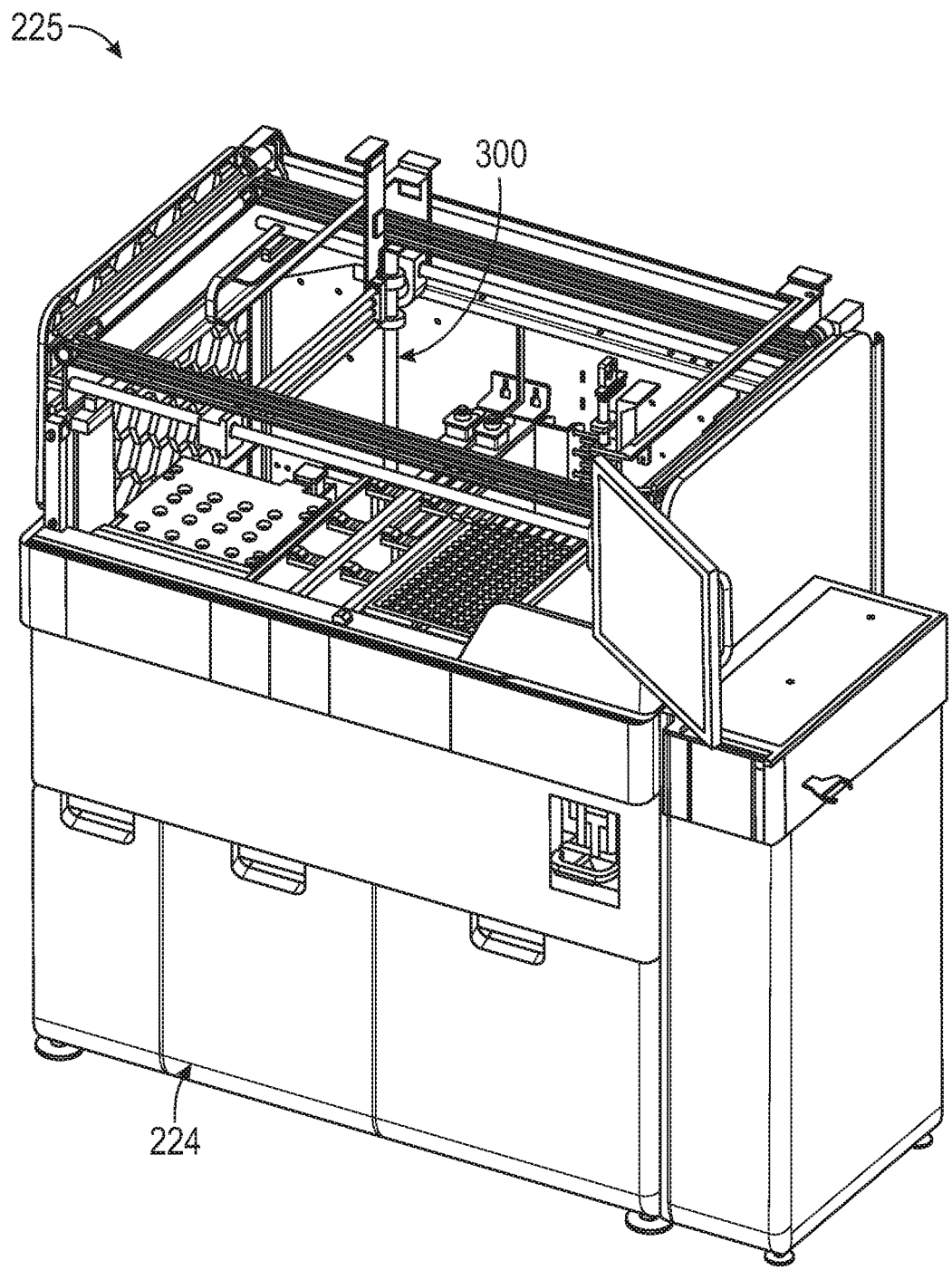
FIG. 1 is a perspective view of an instrument in which a pipette tip holding station as disclosed herein may be implemented.

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or embodiments so described and illustrated.

Unless defined otherwise, all terms of art, notations and other technical terms or terminology used herein have the same meaning as is commonly understood by one of ordinary skill in the art to which this disclosure belongs. All patents, applications, published applications and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

Unless otherwise indicated or the context suggests otherwise, as used herein, "a" or "an" means "at least one" or "one or more."

This description may use relative spatial and/or orientation terms in describing the position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, in front of, behind, next to, adjacent, between, horizontal, vertical, diagonal, longitudinal, transverse, radial, axial, etc., are used for convenience in referring to such component, apparatus, location, feature, or a portion thereof in the drawings and are not intended to be limiting.

Furthermore, unless otherwise stated, any specific dimensions mentioned in this description are merely representative of an exemplary implementation of a device embodying aspects of the disclosure and are not intended to be limiting.

The use of the term "about," or a similar term, applies to all numeric values specified herein, whether or not explicitly indicated. This term generally refers to a range of numbers that one of ordinary skill in the art would consider as a reasonable amount of deviation to the recited numeric values (i.e., having the equivalent function or result) in the context of the present disclosure. For example, and not intended to be limiting, this term can be construed as including a deviation of ±10 percent of the given numeric value provided such a deviation does not alter the end function or result of the value. Therefore, under some circumstances as would be appreciated by one of ordinary skill in the art a value of about 1% can be construed to be a range from 0.9% to 1.1%.

As used herein, the term "adjacent," or a similar term, refers to being near or adjoining. Adjacent objects can be spaced apart from one another or can be in actual or direct contact with one another. In some instances, adjacent objects can be coupled to one another or can be formed integrally with one another.

As used herein, the terms "substantially" and "substantial," or similar terms, refer to a considerable degree or extent. When used in conjunction with, for example, an event, circumstance, characteristic, or property, the terms can refer to instances in which the event, circumstance, characteristic, or property occurs precisely as well as instances in which the event, circumstance, characteristic, or property occurs to a close approximation, such as accounting for typical tolerance levels or variability of the embodiments described herein.

As used herein, the terms "optional" and "optionally," or similar terms, mean that the subsequently described component, structure, element, event, circumstance, characteristic, property, etc. may or may not be included or occur and that the description includes instances where the component, structure, element, event, circumstance, characteristic, property, etc. is included or occurs and instances in which it is not or does not.

As used herein, the term "uninterrupted" or the phrase "uninterrupted processing," or similar terms or phrases, refer to a system or instrument that performs a process involving multiple, sequentially-performed steps without pausing or stopping the process—either during a step or between steps—for any reason other than for a normal or prescribed pause in the process during a step or between one step and the next step. Non-limiting examples of normal pauses include awaiting the passage of a prescribed period of time for a step to be completed, awaiting equipment or materials to reach a prescribed temperature or other required or desired state or condition, or pausing between process steps while one or more shared components required for performing a next step in the process are in use for performing one or more steps of another process.

Figure 2:
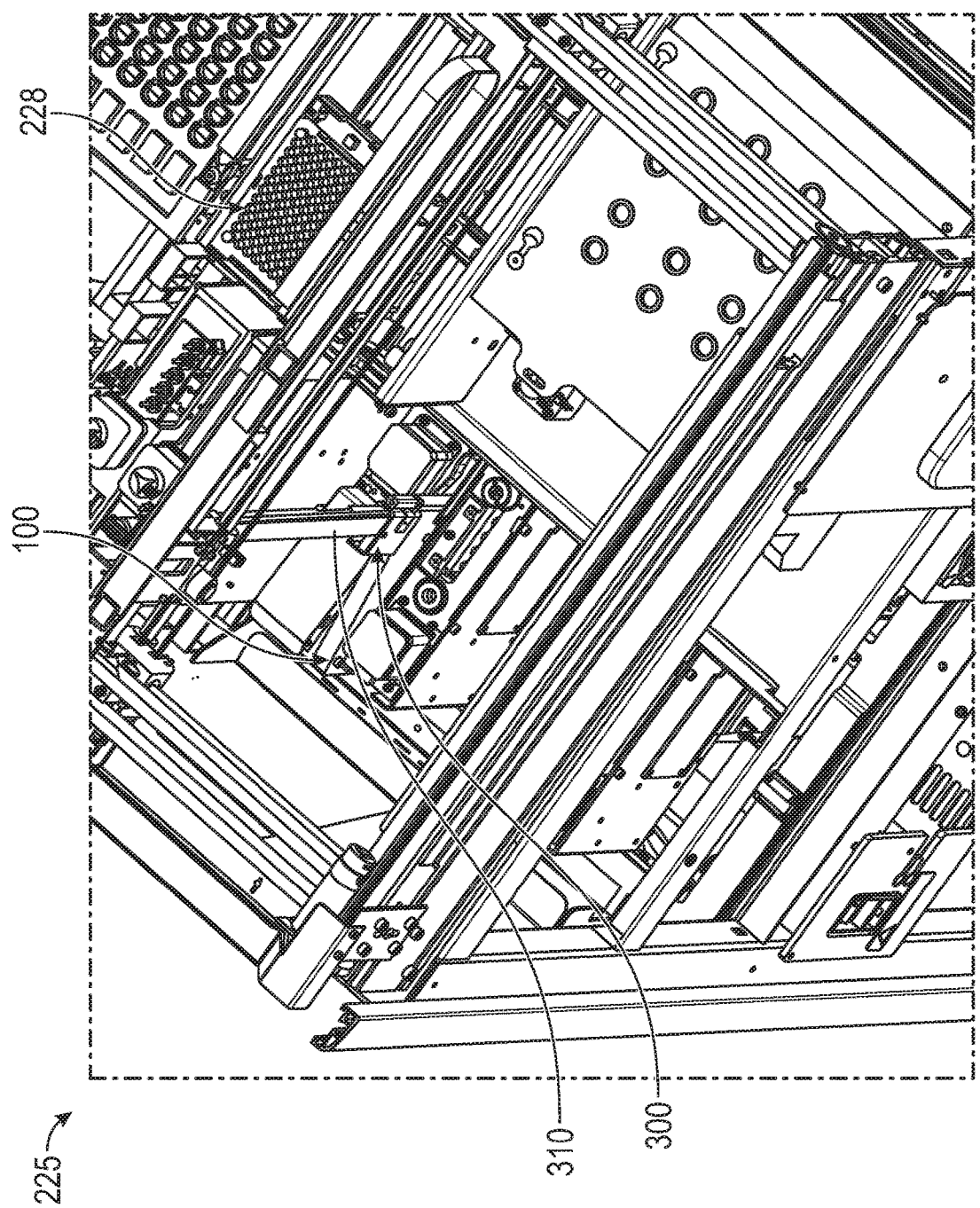
FIG. 2 is a partial perspective view of a portion of the instrument in which the pipette tip holding station may be implemented.
Figure 3:
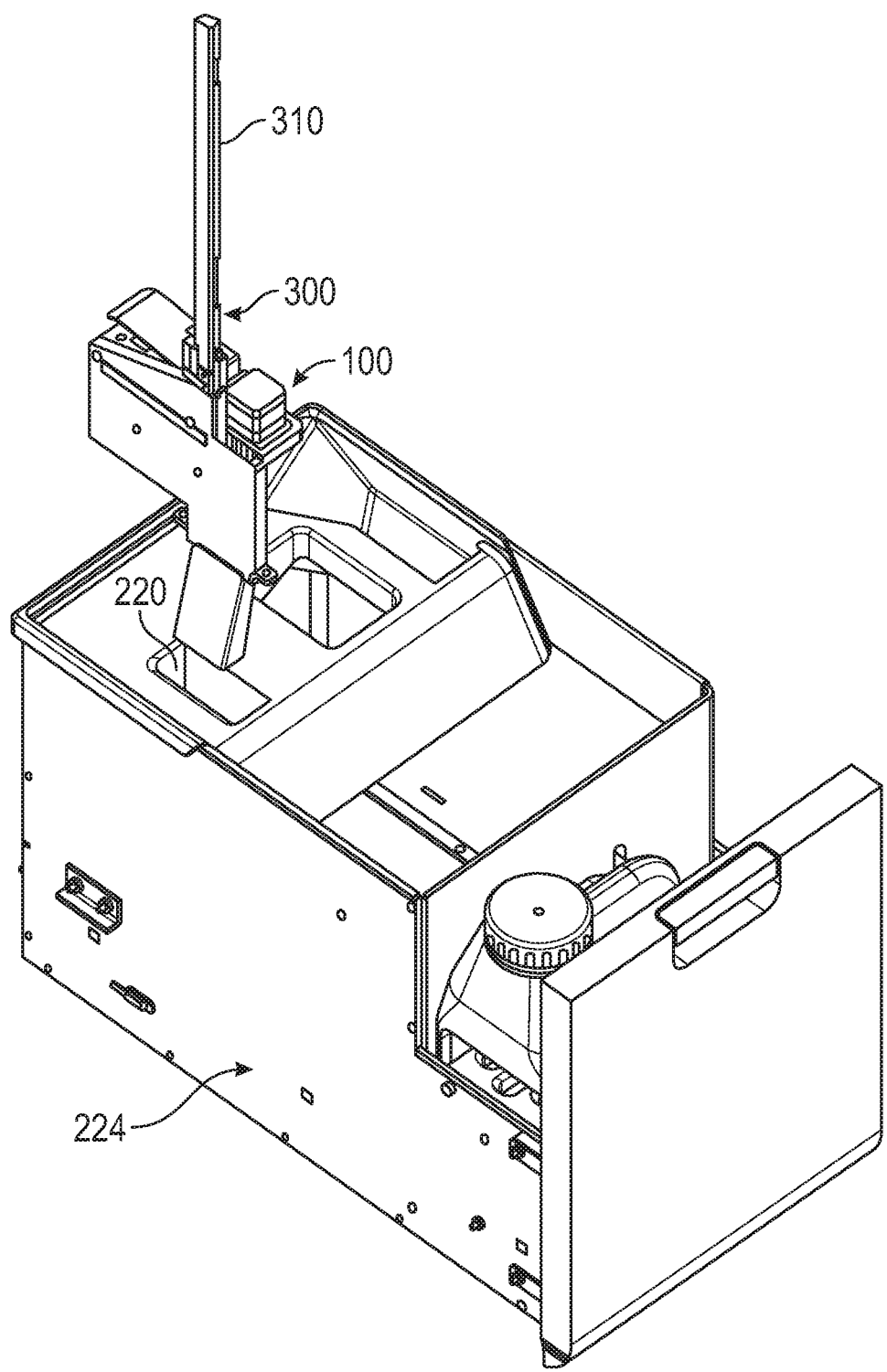
FIG. 3 is a perspective view of the holding station along with an automated pipettor, a waste container, and a waste drawer of the instrument.

An instrument in which a pipette tip holding station as disclosed herein may be implemented is indicated by reference number 225 in FIGS. 1 and 2 and includes an automated, robotic pipettor 300. Referring to FIGS. 2 and 3, a pipette tip holding station for capturing and temporarily holding (sequestering) pipette tips separated from a pipettor is represented by reference number 100 and may be referred to as the "holding station" herein. As shown in FIGS. 2 and 3, holding station 100 is disposed beneath pipettor 300. A waste container 220 for receiving pipette tips discarded by pipettor 300 may be supported in a waste drawer 224 of instrument 225 (see FIGS. 1 and 3) configured for lateral movement into or out of instrument 225. Waste container 220 may be lined with a plastic bag, which may be disposable. Holding station 100 is disposed above waste container 220 when drawer 224 is in a closed position moved laterally into instrument 225 as shown in FIG. 3.

The instrument 225 may be a chemical or biological analyzer, such as a molecular analyzer for performing nucleic acid-based amplification reactions. Exemplary processing instruments with which holding station 100 may be used include analyzers described in U.S. Pat. Nos. 8,731,712 and 9,732,374 and International Patent Application No. PCT/US2018/041472, as well as the Panther® and Panther Fusion® systems available from Hologic, Inc. (Marlborough, MA).

Pipettor 300 may be configured for lateral and vertical movement, e.g., in X, Y, and Z directions, and is used for withdrawing liquids from containers and dispensing liquids into containers. For example, pipettor 300 may be used to transfer one or more reagents from one or more reagent container to one or more reaction receptacles and to transfer sample material from one or more sample containers to one or more reaction receptacles to form a reaction mixture. Reagents may be stored in a liquid state, or the reagents may be stored in a non-liquid, e.g., lyophilized, state, in which case the pipettor may be is used to transfer a reconstitution agent into the reagent container and then to transfer the reconstituted reagent to the reaction container. Instrument 225 may include a tray or container 228 (see FIG. 2) holding a plurality of pipette tips. The tray or container 228 may reside within a pipette tip holder bay (e.g., a drawer) of instrument 225 in a position and orientation enabling pipettor 300 to selectively engage individual pipette tips for removable attachment to pipettor 300.

Figure 17:
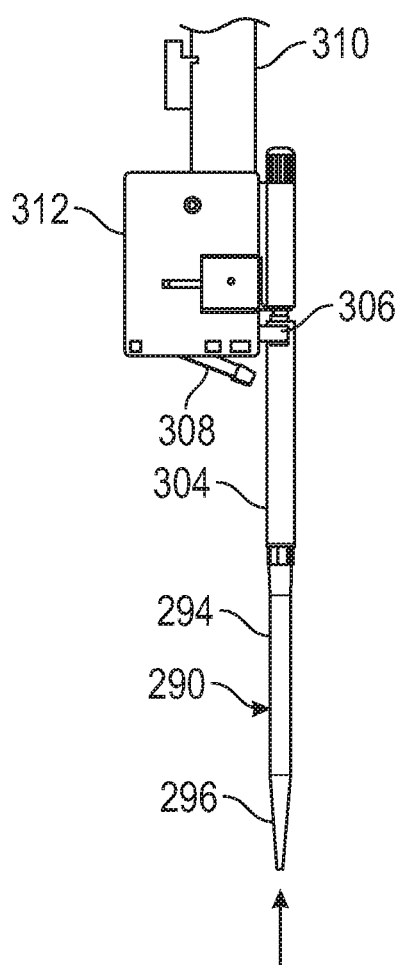
FIG. 17 is a side view of an automated pipettor with a disposable pipette tip attached thereto.
Figure 18:
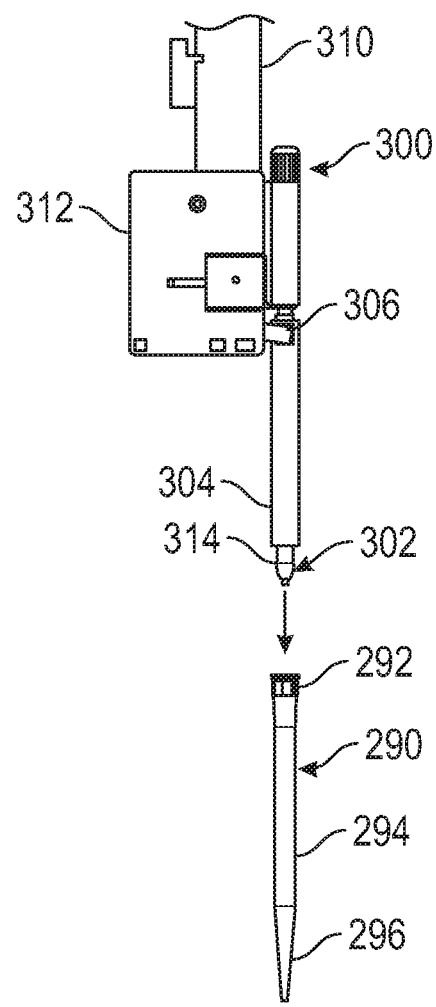
FIG. 18 is a side view of the automated pipettor with the disposable pipette tip released therefrom.

As shown in FIGS. 17 and 18, pipettor 300 may have a probe 302 (shown only in FIG. 18), with a mounting end 314 (which may be a distal end of a probe) on which a disposable pipette tip 290 is removably attached. In an embodiment, the mounting end 314 of pipettor 300 is configured to receive pipette tip 290 in a frictional fit when the mounting end 314 is inserted into pipette tip 290 or pipette tip 290 is mounted onto the mounting end 314. Referring to FIG. 18, an embodiment of pipette tip 290 includes a collar 292 at a first (proximal) end of pipette tip 290, a conically tapered tip 296 at a second (distal) end of pipette tip 290, and a barrel section 294 between collar 292 and tip 296 that may be cylindrical in shape with a generally constant diameter. Exemplary, commercially available pipette tips are available from TECAN (TECAN Inc., Research Triangle Park, NC).

As shown in FIGS. 17 and 18, pipettor 300 includes a generally vertical pipettor arm 310 terminating in a housing 312 which couples probe 302 to pipettor arm 310. Housing 312 couples or connects probe 302 to a source of pressure (vacuum or positive pressure) through arm 310. Pipettor 300 may include a tip release mechanism for releasing the pipette tip 290 from mounting end 314 of probe 302. In an embodiment, the tip release mechanism includes a release sleeve 304 is coaxially mounted over the probe 302 and is movable in an axial direction with respect to probe 302. Release sleeve 304 is connected to a release lever 306 configured to move release sleeve 304 axially with respect to probe 302. A release trigger 308 (shown only in FIG. 17) is coupled to release lever 306 by a linkage (not shown) within housing 312.

The pipette tip 290 is frictionally secured to probe 302 by inserting probe 302 into an opening surrounded by collar 292 of a pipette tip 290 supported in pipette tray 228. As probe 302 is inserted into pipette tip 290, the top end of probe 290 contacts release sleeve 304, pushing the sleeve 304 and release lever 306 upwardly to the position shown in FIG. 17. When the sleeve 304 and release lever 306 are pushed up, the linkage coupling release lever 306 to release trigger 308 causes release trigger 308 to extend below the housing 312, as shown in FIG. 17. To eject or release pipette tip 290 from the pipettor 300, pipette arm 310 is lowered until release trigger 308 contacts a release surface that pushes the release trigger 308 upwardly into housing 312, thereby moving the release lever 306 and release sleeve 304 axially downwardly with respect to probe 302. Downward movement of release sleeve 304 contacts the top end of pipette tip 290 frictionally secured to probe 302, thereby forcing the pipette tip 290 off of the probe 302 to release the pipette tip 290 from the pipettor 302.

Figure 4:
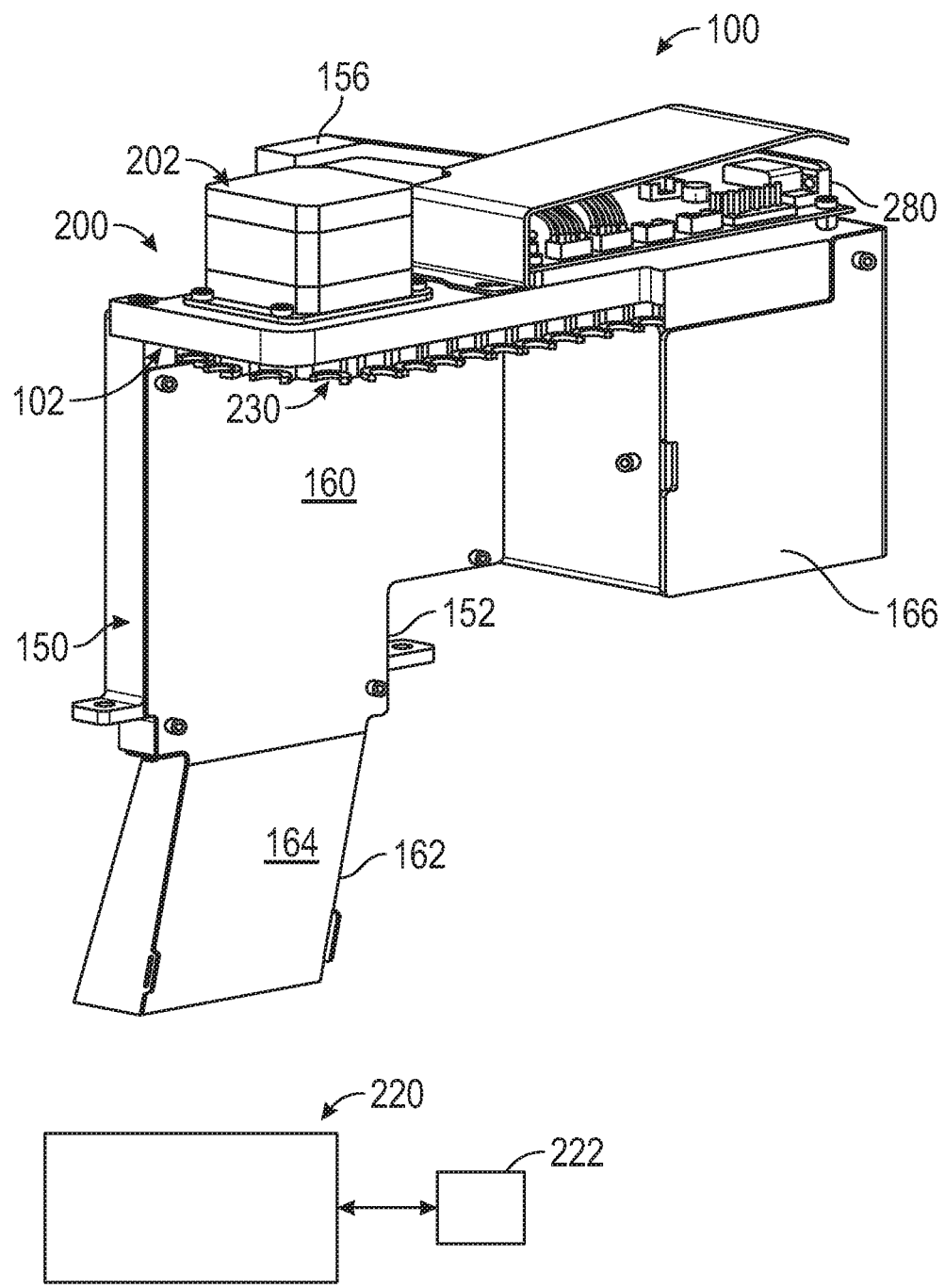
FIG. 4 is a perspective view of the holding station along with the waste container and a waste container sensor schematically shown.

As shown in FIG. 4, an embodiment of holding station 100 includes a top frame 102, a side box frame 150, a side cover panel 160 disposed over the side box frame 150, an upper waste chute 152 (which may be a lower portion of side box frame 150) connecting to a lower waste chute 162, and a waste chute cover panel 164 disposed over lower waste chute 162. Holding station 100 further includes a holding compartment 166 disposed below a portion of top frame 102. As noted above, waste container 220, indicated schematically by a box in FIG. 4, comprises a container positioned beneath waste chute 162 to receive waste items, such as pipette tips, falling through the chute 162. The waste container may be lined with a bag, typically disposable and plastic. As noted above, waste container 220 may be supported within instrument 225 in drawer 224 configured for lateral movement (e.g., fore and aft movement relative to a front of the instrument 225) between a first, or closed, position within the instrument 225 and a second, or open position, in which drawer 224 is pulled from the instrument 225 in a manner enabling access to waste container 220 so that the waste container can be removed from drawer 224 and emptied and/or a bag lining waste container 220 can be removed from the waste container 220 and replaced with a new, empty bag.

When waste container 220 is positioned beneath waste chute 162 of holding station 100—e.g., when the drawer is in the first, or closed, position—the waste container 220 is in a pipette tip-receiving position with respect to pipettor 300 in that it is positioned to capture used pipette tips released by the pipettor 300. In various embodiments, a waste container sensor 222 generates a signal for system control software—described below—to detect the presence or absence of waste container 220 (i.e., waste container sensor 222 detects whether waste container 220 is in the pipette tip-receiving position). Alternatively, if the waste container 220 is supported within a drawer, waste container sensor 222 may detect if the drawer 224 is in the open or closed position to determine whether waste container 220 is in the pipette tip-receiving position. Waste container sensor 222 may include any sensor for detecting the presence or absence of the waste container 220 and/or the position of drawer 224, such as a proximity sensor, a contact sensor, a switch, an optical sensor, etc.

In an exemplary embodiment, holding station 100 may optionally include a printed circuit board 280 attached to top frame 102. Circuit board 280 may include circuitry and power and logic components for controlling and providing power to holding station 100.

Figure 5:
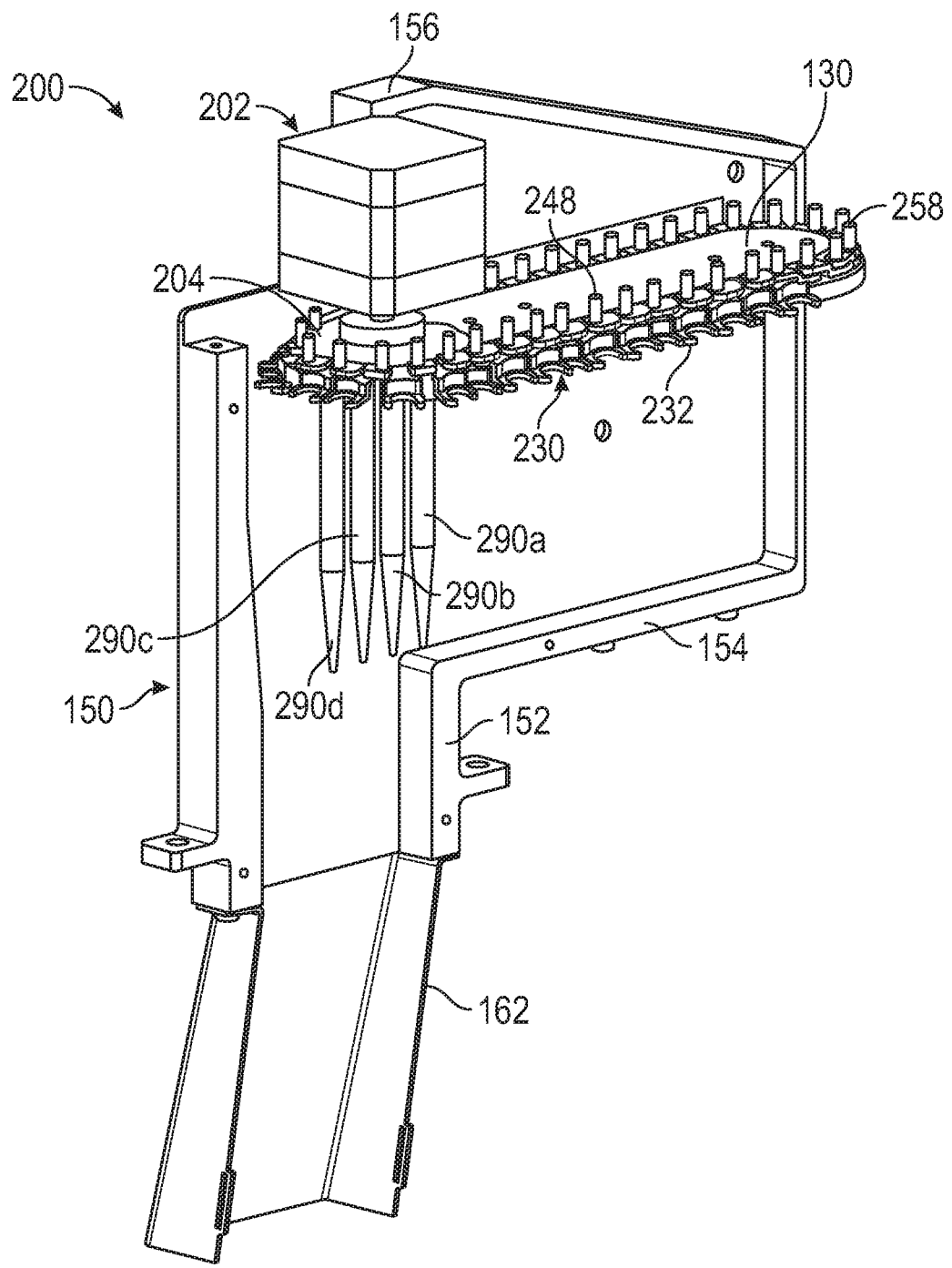
FIG. 5 is a perspective view of the holding station with various components, frame elements, and cover panels omitted to reveal internal components of the apparatus.

FIG. 5 is a perspective view of holding station 100 in which top frame 102, printed circuit board 280, side cover panel 160, holding compartment 166, and waste chute cover panel 164 are omitted to reveal internal components of holding station 100. As shown in FIG. 5, holding station 100 includes a tip holder conveyor that, in the illustrated embodiment, comprises a tip holder chain 230 partially supported on a lower track panel 130 and driven by a chain drive mechanism 200. Chain drive mechanism 200 includes a motor 202 mounted on top frame 102 and connected to a drive wheel 204 that is operatively coupled to tip holder chain 230. Motor 202 may be controlled by, and power may be transmitted to motor 202 by, one or more components of printed circuit board 280.

Figure 6:
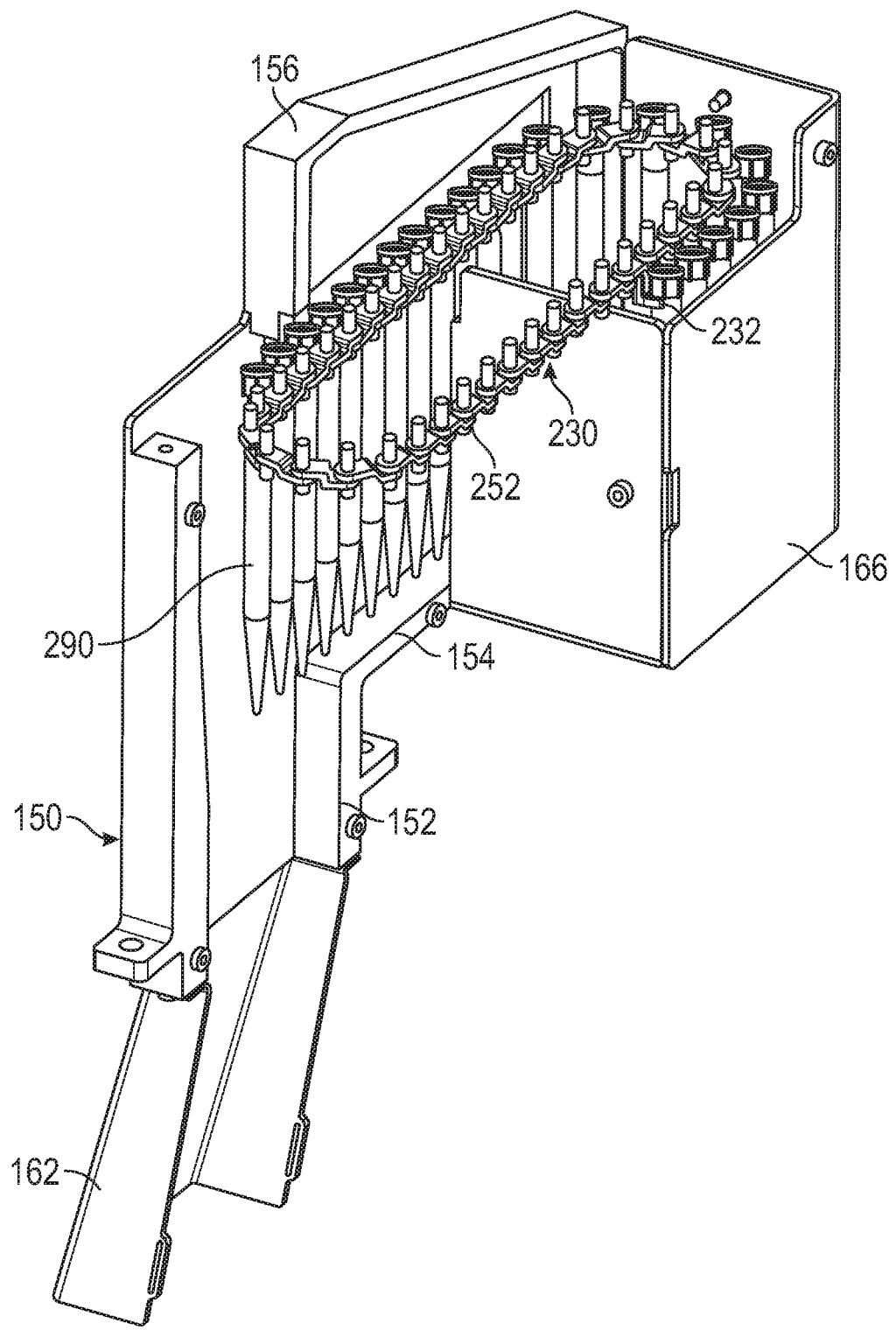
FIG. 6 is a perspective view of the holding station with various components, frame elements, and cover panels omitted to reveal internal components of the apparatus.
Figure 7:
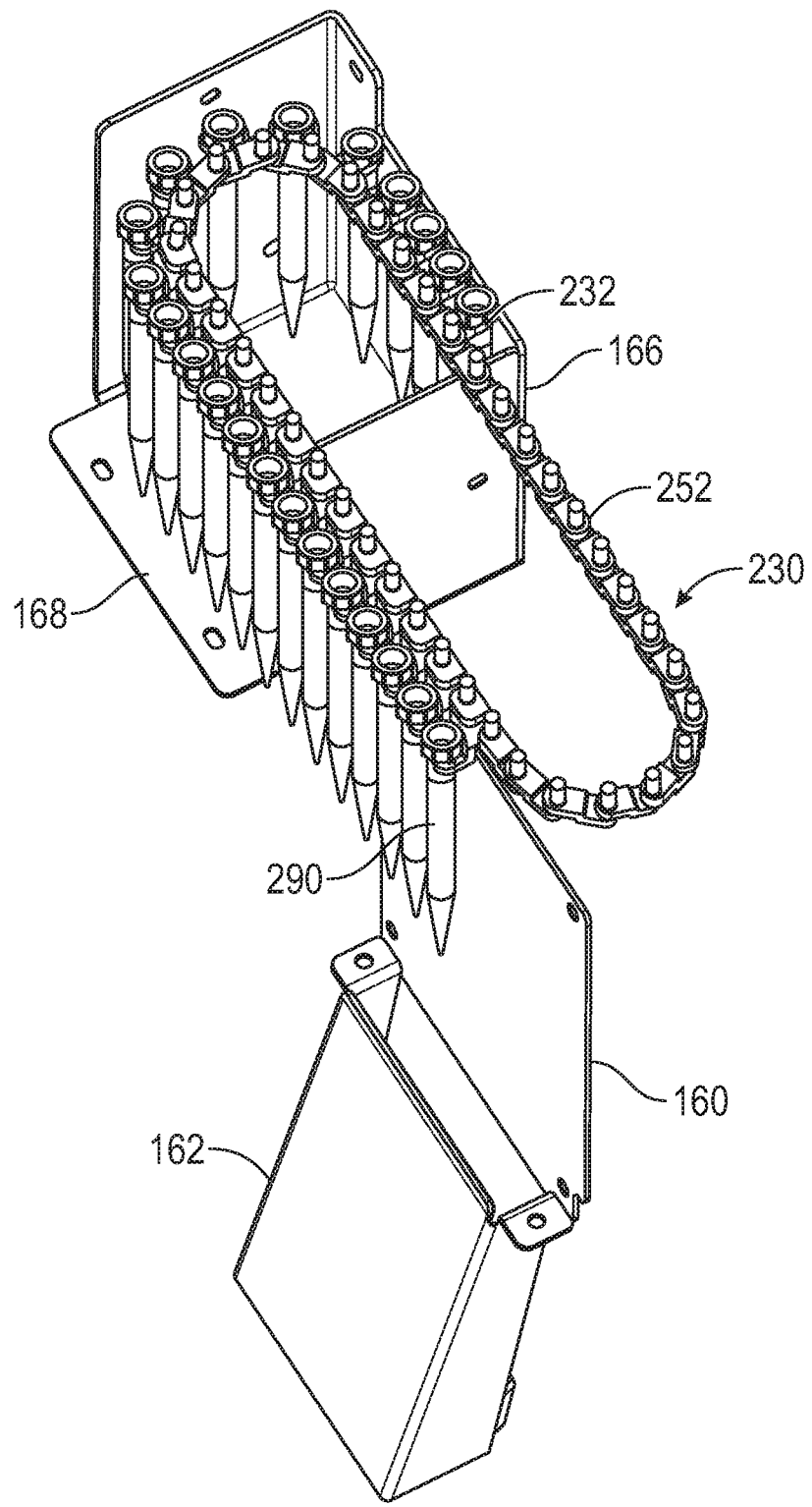
FIG. 7 is a perspective view of the holding station with various components, frame elements, and cover panels omitted to reveal internal components of the apparatus.

FIG. 6 is a perspective view of holding station 100 in which top frame 102, drive mechanism 200, printed circuit board 280, side cover panel 160, lower track panel 130, and waste chute cover panel 164 are omitted to reveal internal components of holding station 100. FIG. 7 is a perspective view of holding station 100 in which top frame 102, drive mechanism 200, printed circuit board 280, side box frame 150, and lower track panel 130 are omitted to reveal internal components of holding station 100. As shown in FIGS. 6 and 7, tip holder chain 230 may include a plurality of tip holder links 232 and a plurality of connector links 252. In FIG. 6, each tip holder link 232 is shown holding a pipette tip 290, although, depending on the status of holding station 100, one or more tip holder links 232, or all tip holder links 232, may not be holding a pipette tip 290. As shown in FIGS. 5 and 6, box frame 150 includes a lower flange 154, and a portion of the pipette tips 290 carried on tip holder chain 230 are disposed above the lower flange 154 and behind the side cover panel 160. In an embodiment, tip holder chain 230 is a continuous chain supported on a continuous track (as will be described in more detail below), and a portion of the pipette tips 290 carried on tip holder chain 230 may reside in the holding compartment 166 above a drip panel 168 (see FIG. 7) that cooperates with lower flange 154 of box frame 150 to form a drip tray beneath the pipette tips 290 supported on tip holder chain 230. The drip tray is positioned to capture residual liquid that may fall from the pipette tips 290 carried on tip holder chain 230 and may direct the captured liquid toward upper chute 152 and lower chute 162 and to waste container 220.

As shown in FIGS. 6 and 7, tip holder chain 230 may comprise a continuous chain of a plurality of interconnected tip holders, each configured to receive and hold a pipette tip that is released from the pipettor. In an example, the tip holders comprise tip holder links 232, twenty-two tip holder links 232 in the illustrated embodiment. In alternate embodiments, the tip holder chain may comprise fewer or more than twenty-two tip holder links 232. Tip holder chain 230 may further include a plurality of connector links 252 connected to adjacent connector links 252 or adjacent tip holder links 232 by pins, as described below.

In an alternate embodiment, the tip holder chain is not continuous—or, necessarily, even a chain—but may comprise a straight or curved chain or rail with a plurality of tip holders supported thereon.

Figure 8:
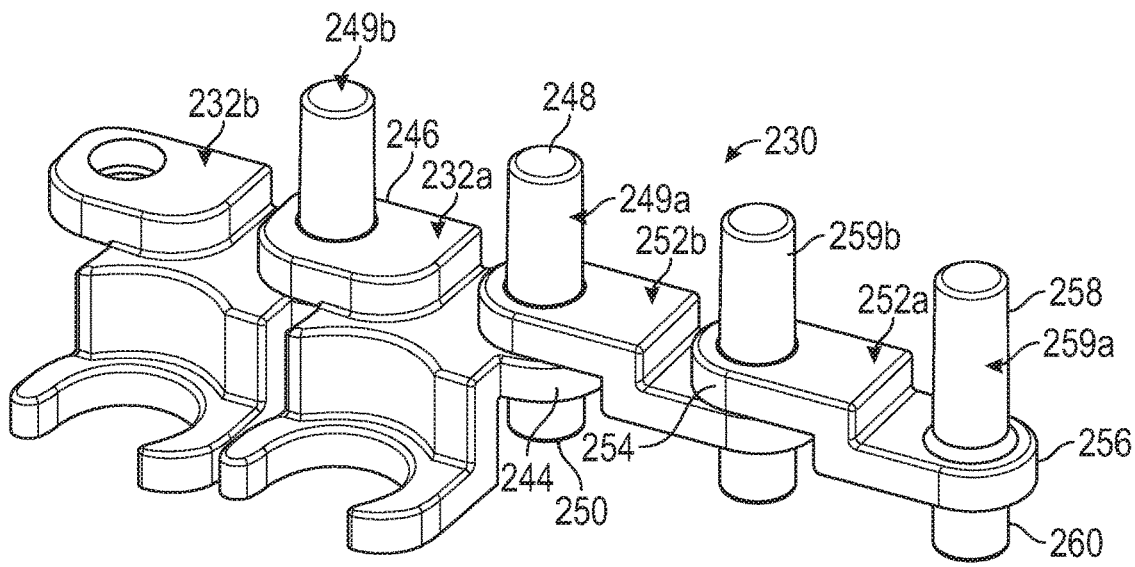
FIG. 8 is a perspective view of a portion of a tip holder chain including two tip holder links and two connector links.
Figure 9:
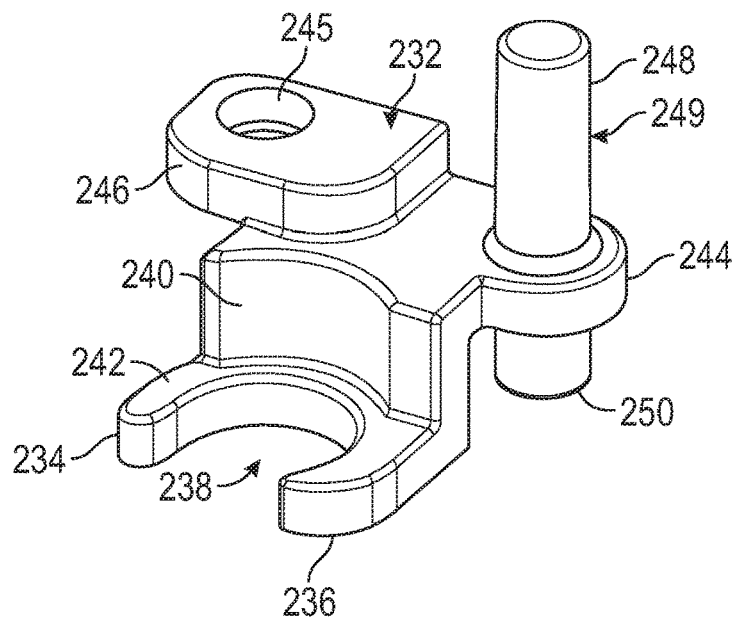
FIG. 9 is a perspective view of a single tip holder link and a connector pin.
Figure 10:
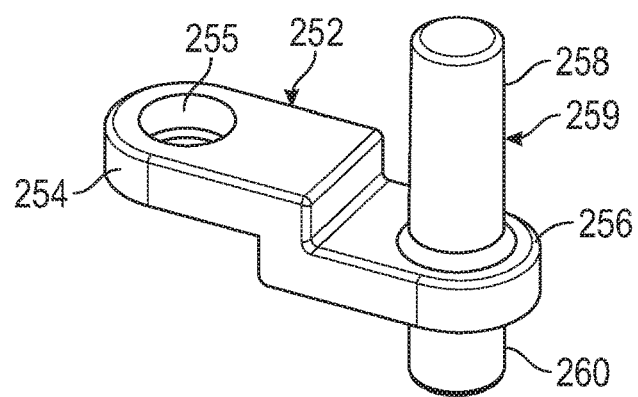
FIG. 10 is a perspective view of a single connector link and a connector pin.

Features of an embodiment of a tip holder chain 230 are shown in FIGS. 8, 9, and 10. FIG. 8 is a perspective view of a portion of tip holder chain 230 including two tip holder links 232a and 232b and two connector links 252a and 252b. FIG. 9 is a perspective view of a single tip holder link 232 and a connector pin 249. FIG. 10 is a perspective view of a single connector link 252 and a connector pin 259.

Referring to FIG. 9, each tip holder link 232 includes a holder clip defined by opposed arms 234 and 236 with a lateral opening, or gap, 238 defined between distal ends of arms 234, 236. Tip holder link 232 includes a lower lug 244 and an upper lug 246. A riser 240 extends from opposed arms 234, 236 to lugs 244, 246. A tip-supporting shelf 242 is partially formed by the top surfaces of arms 234, 236 and extends between arms 234, 236 across the riser 240. In an embodiment, a space partially encompassed by arms 234, 236 and riser 240 defines an opening configured to receive the barrel 294 of a pipette tip 290 with little or no resistance and with the collar 292 of the pipette tip 290 supported on the tip-supporting shelf 242.

A connector pin, or post, 249 extends through, and is preferably fixed within, lower lug 244 with an upper portion 248 (upper post) extending above lower lug 244 and a lower portion 250 (lower post) extending below lower lug 244. A pin opening 245 in upper lug 246 receives a connector pin of an adjacent link.

Referring to FIG. 10, each connector link 252 includes a first lug 254 and a second lug 256, wherein first lug 254 is disposed above second lug 256. A connector pin, or post, 259 extends through, and is preferably fixed within, second lug 256 with an upper portion 258 (upper post) extending above second lug 256 and a lower portion 260 (lower post) extending below second lug 256. A pin opening 255 in the first lug 254 receives a connector pin of an adjacent link.

As shown in FIG. 8, one connector link 252a is connected to an adjacent connector link 252b by inserting connector pin 259b of second connector link 252b through the pin opening 255 in first lug 254 of the first connector link 252a. One tip holder link 232a is connected to an adjacent tip holder link 232b by inserting connector pin 249b of second tip holder link 232b through pin opening 245 in the upper lug 246 of the first tip holder link 232a. Connector link 252b is connected to an adjacent tip holder link 232a by inserting connector pin 249a of adjacent tip holder link 232a through the pin opening 255 in the first lug 254 of the connector link 252b.

Figure 11:
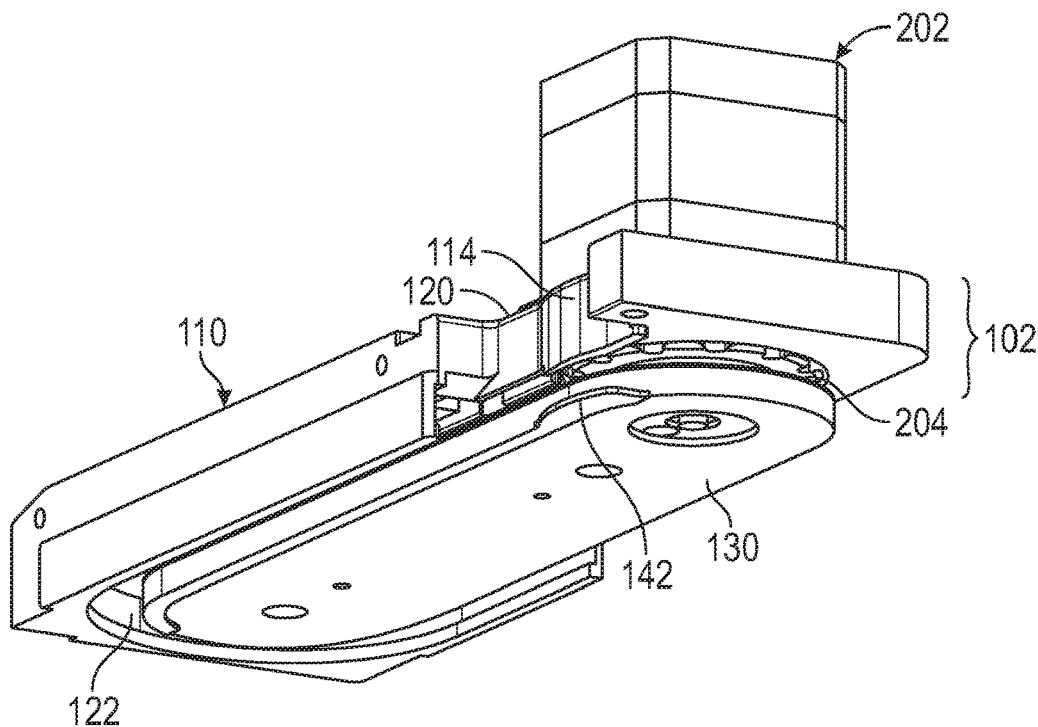
FIG. 11 is a bottom perspective view of a top frame of the pipette tip holding station in isolation.
Figure 12:
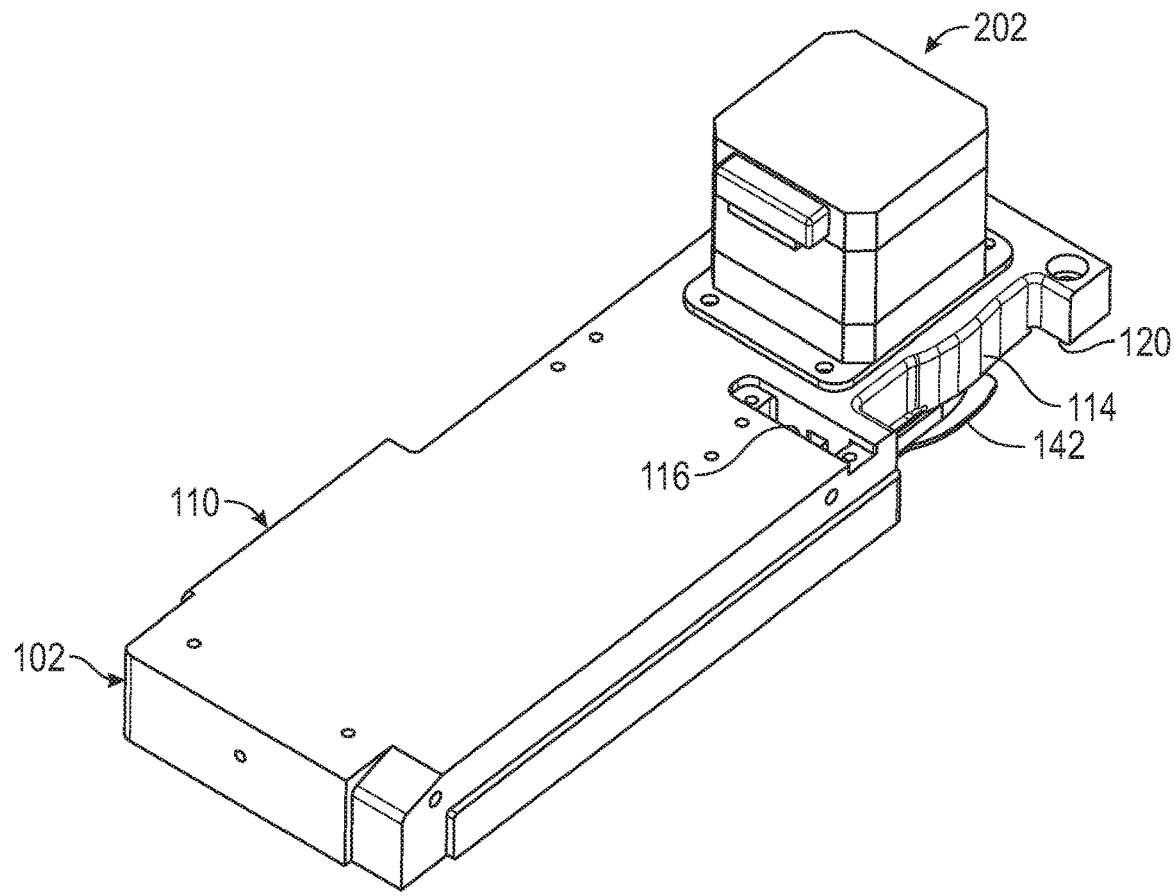
FIG. 12 is a top perspective view of the top frame in isolation.

Features of top frame 102 are shown in FIGS. 11-16. FIG. 11 is a bottom perspective view of top frame 102 in isolation, and FIG. 12 is a top perspective view of top frame 102. The tip holder chain (not shown in FIG. 11 or 12) is supported in a track 122 defined between an upper track panel 110 and a lower track panel 130 that form top frame 102. The drive motor 202 of chain drive mechanism 200 is mounted on top of upper track panel 110, and chain drive wheel 204 is disposed between the upper track panel 110 and the lower track panel 130. Chain drive wheel 204 may be rotatably supported in upper frame 102 by a bearing 214 formed in upper track panel 110 (see FIG. 13) and a bearing in lower track panel 130. A release opening 120 is formed along one edge of the upper track panel 110. A tip ejector positioned adjacent to the release opening 120 is defined by an upper tip ejector ramp, or wedge, 114 that is part of the upper track panel 110 and a lower tip ejector ramp, or wedge, 142 that is part of the lower track panel 130.

Figure 13:
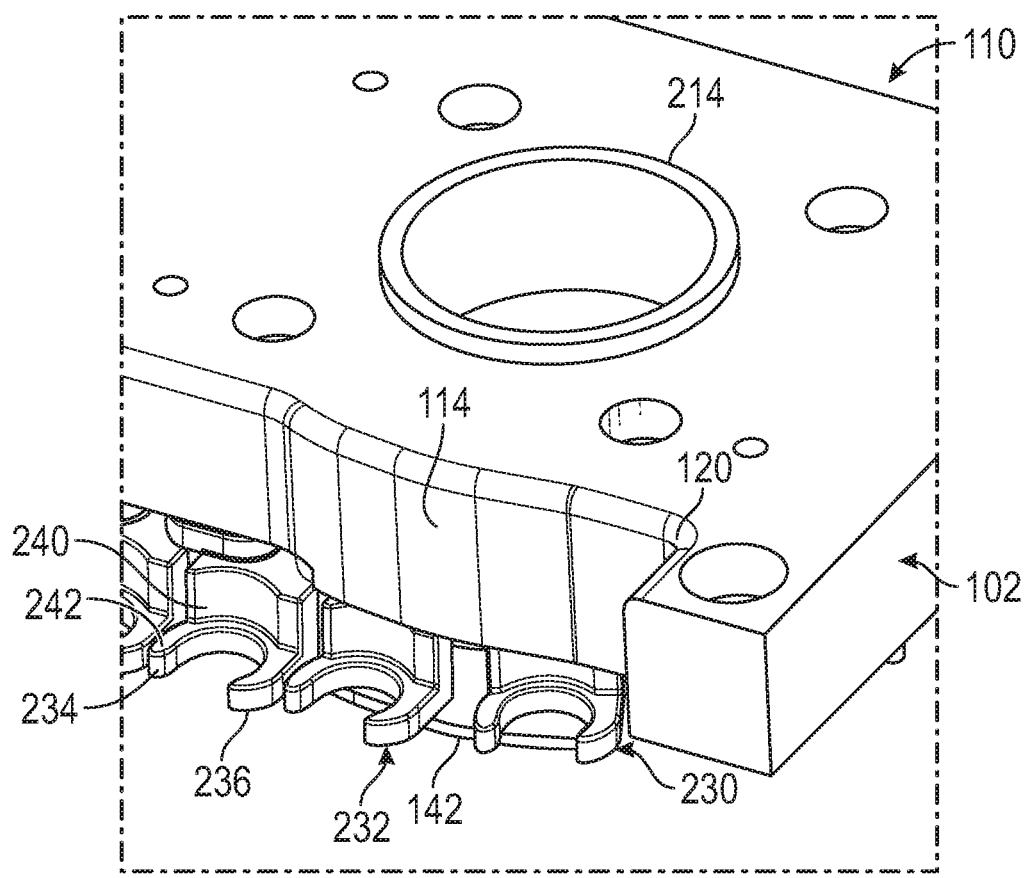
FIG. 13 is a partial top perspective view of the top frame and a portion of the tip holder chain.

FIG. 13 is a partial top perspective view of the top frame 102 and a portion of the tip holder chain 230. As shown in FIG. 13, the tip holder chain 230 is supported by upper track panel 110 and lower track panel 130 so that a portion of tip holder chain 230 passes between upper tip ejector ramp 114 and lower tip ejector ramp 142.

Figure 14:
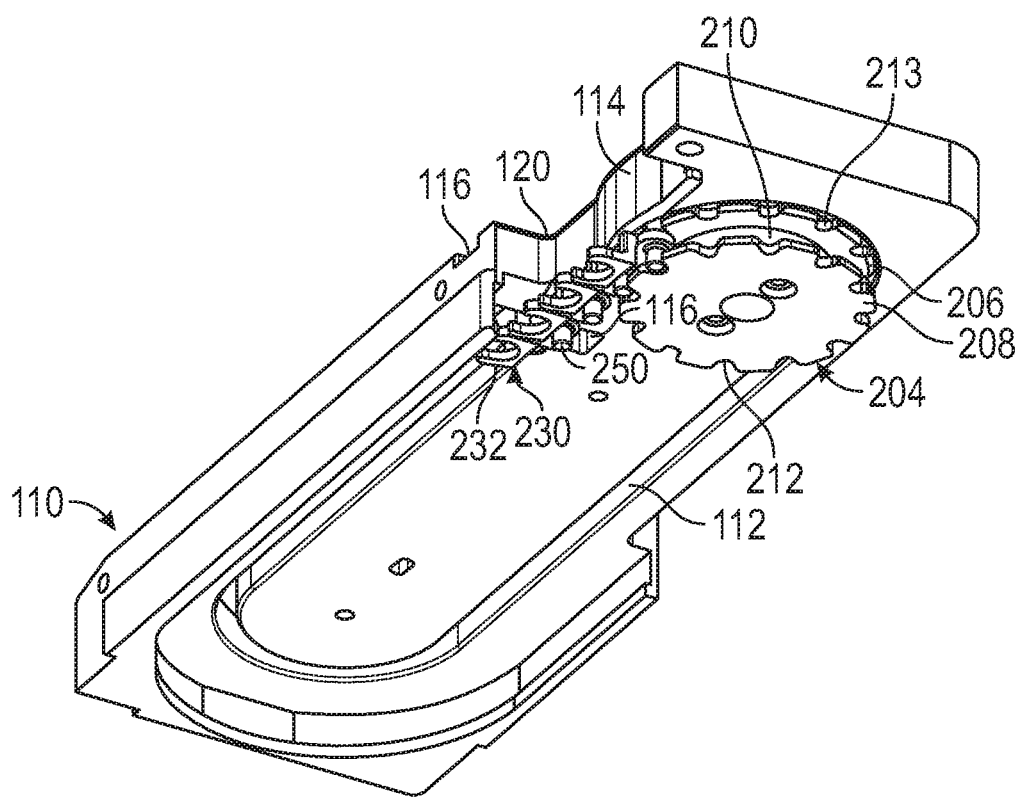
FIG. 14 is a bottom perspective view of an upper track panel of the top frame in isolation with a portion of the tip holder chain.

FIG. 14 is a bottom perspective view of the upper track panel 110 in isolation with a portion of a tip holder chain 230. As shown in FIG. 14, tip holder chain 230 is disposed in a upper track slot 112 formed in upper track panel 110. Specifically, the upper posts 248 and 258 of tip holder links 232 and the connector links 252, respectively, of tip holder chain 230 (see FIGS. 9 and 10) extend into upper track slot 112. A sensor opening 116 is formed in the upper track panel 110 (see also FIG. 12) and spans across a portion of upper track slot 112. An optical sensor (not shown in FIG. 12 or 14) may be installed in opening 116 to detect passage of the upper posts 248, 258 of tip holder chain 230 as the chain 230 passes through the opening 116. In an embodiment, the sensor comprises an optical transmitter on one side of upper track slot 112 and an optical receiver on an opposite side of track slot 112. As tip holder chain 230 advances around upper track slot 112, the upper posts 248, 258 of tip holder chain 230 pass through the opening 116 between the optical transmitter and receiver of the optical sensor disposed therein, thereby interrupting an optical beam from the transmitter to the receiver and generating a signal as each post of tip holder chain 230 passes through the sensor positioned in opening 116. Accordingly, the position of tip holder chain 230 can be monitored by a system controller—described below—by counting the number of posts that have passed through the sensor as well as by using encoder counts or motor counts of the chain drive motor 202.

In an embodiment, one of the posts may be designated a "home" post, thereby identifying a particular position of the tip holder chain 230 as the "home" position. For example, the "home" post may be shorter than all other posts and is short enough that the post height does not trip the optical sensor within the sensor opening 116. The system control software expects to see the optical sensor tripped after a certain number of motor steps. In the case of finding home, it sees that the expected number of motor steps to the next post has been exceeded, so the software continues to move the tip holder chain until the next post trips the sensor. The control software then reverses direction of the tip holder chain by a set number of motor steps to set that position as home.

As also shown in FIG. 14, in an embodiment, chain drive wheel 204 comprises an upper wheel 206 and a lower wheel 208 connected by a connecting hub 210. Peripheral notches 213 are formed in upper wheel 206, and peripheral notches 212 are formed in lower wheel 208. Upper posts 248, 258 of tip holder chain 230 are received in upper peripheral notches 213 of upper wheel 206 as the chain drive wheel 204 rotates, and lower posts 250, 260 of tip holder chain 230 are received in lower peripheral notches 212 of lower wheel 208 as chain drive wheel 204 rotates (see also FIGS. 15 and 16).

Figure 15:
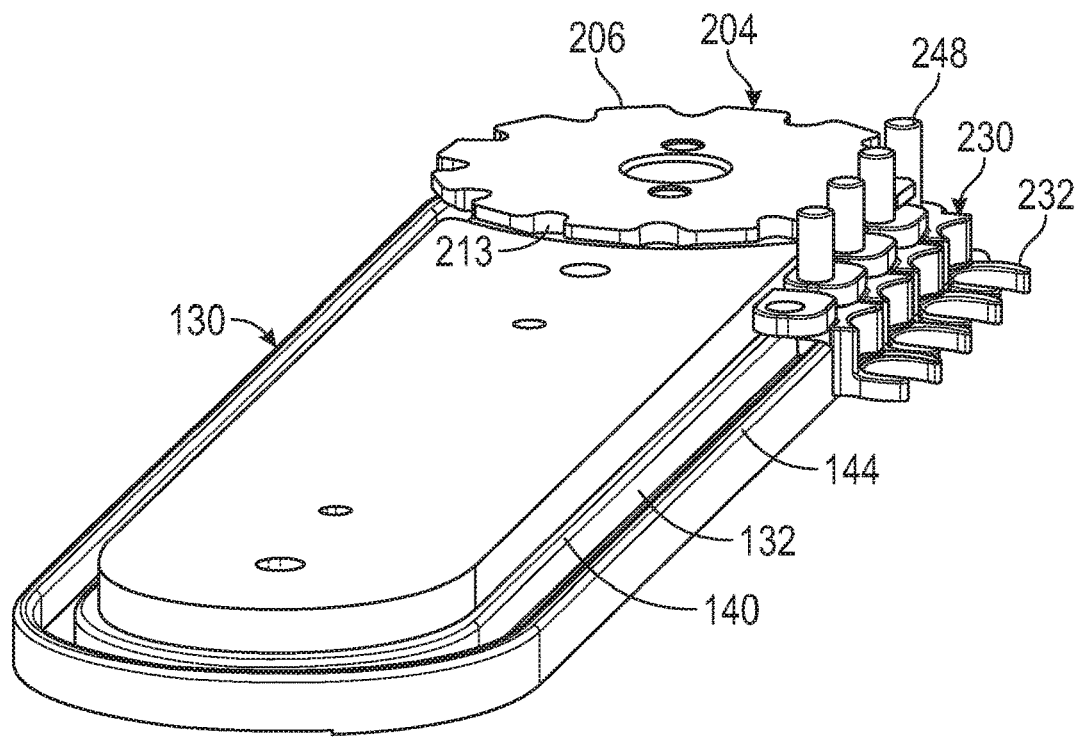
FIG. 15 is a top perspective view of a lower track panel of the top frame in isolation with a portion of the tip holder chain.
Figure 16:
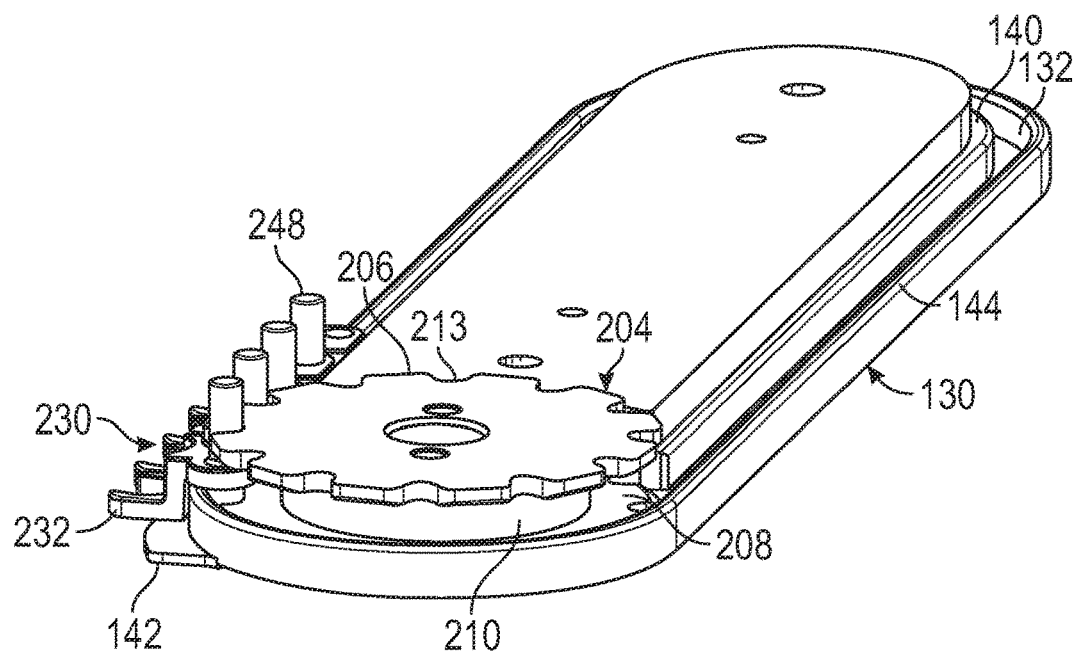
FIG. 16 is a top perspective view of a lower track panel of the top frame in isolation with a portion of the tip holder chain.

FIGS. 15 and 16 are top perspective views of the lower track panel 130 in isolation with a portion of the tip holder chain 230. Lower track panel 130, which is secured to the bottom of upper track panel 110, includes a lower track slot 132 about a portion of its perimeter. Chain drive wheel 204 is rotatably supported on lower track panel 130. When lower track panel 130 is secured to upper track panel 110, lower track slot 132 aligns with upper track slot 112. A lower track inner shelf 140 and a lower track outer shelf 144 are disposed on opposite sides of lower track slot 132. The tip holder chain 230 is supported on lower track inner shelf 140 and lower track outer shelf 144 within the lower track slot 132. More specifically, a lower portion of each tip holder link 232 forming the lower and upper lugs 244, 246 is supported on the lower track inner shelf 140 and the lower track outer shelf 144 and the lower post 250 of each connector pin 249 extends into the lower track slot 132. Similarly, although not shown in FIGS. 15 and 16, each connector link 252 of tip holder chain 230 is similarly supported with the second, lower lugs 256 supported on the lower track inner shelf 140 and the lower track outer shelf 144, and the lower post 260 of each of the connector pins 259 extends into the lower track slot 132.

Figure 19:
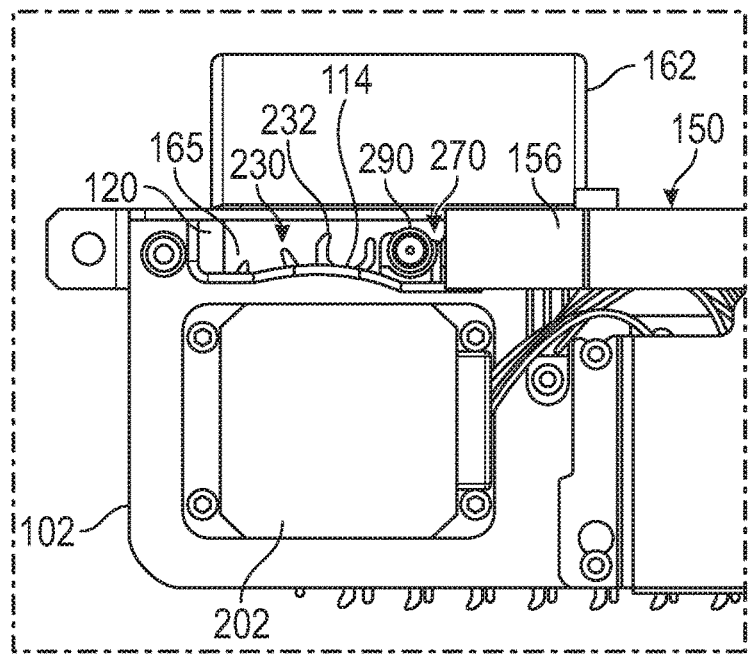
FIG. 19 is a partial top view of the holding station.
Figure 20:
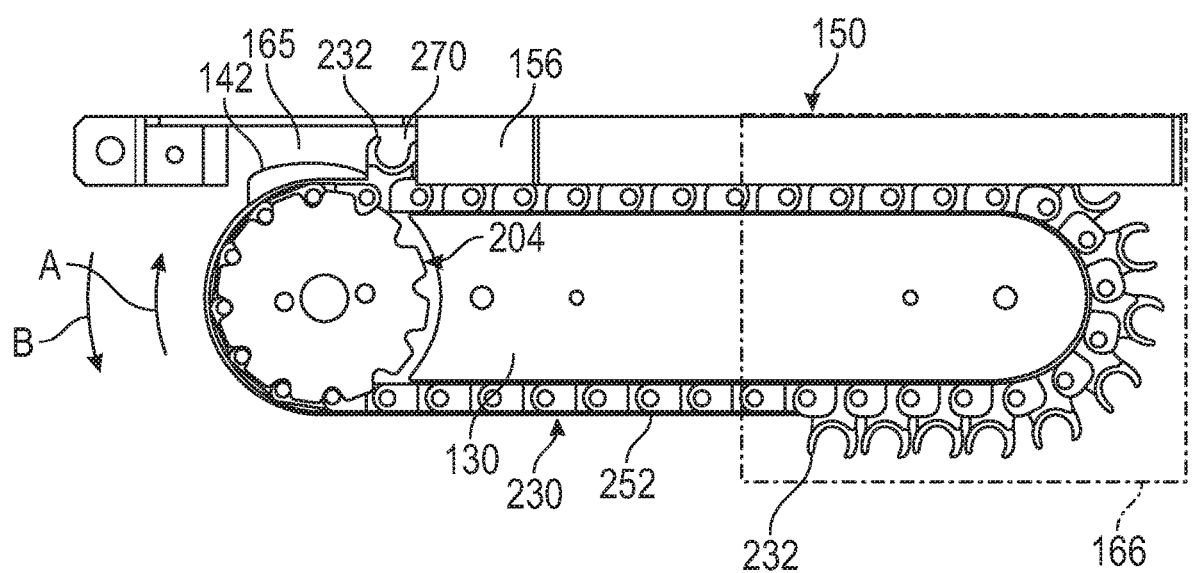
FIG. 20 is a top view of the holding station with various components, frame elements, and cover panels omitted to reveal internal components of the apparatus.

Under normal operation of instrument 225 and pipettor 300, after a pipette tip 290 has been used, the pipettor 300 moves to a tip release location 270 at release opening 120 formed in top frame 102, as shown in FIGS. 19 and 20. The pipettor 300 will lower the pipette tip 290 into release opening 120 at the tip release location 270, and the pipette tip 290 will be released (ejected) from the pipettor 300 to fall through release opening 120, behind side cover panel 160, through lower waste chute 162 behind waste chute cover panel 164, and into waste container 220. During this operation, while the waste container 220 is in place, or drawer 224 supporting the waste container is closed—as detected by waste container sensor 222—tip holder chain 230 (or tip holder conveyer in an embodiment that does not include a tip holder chain) is held in a first or standby position in which none of the tip holder links 232 (or tip holders in an embodiment that does not include a tip holder chain) is located at the tip release location 270, and, typically, none of the holder links is holding a pipette tip. When waste container 220 is removed, or drawer 224 is opened, as detected by sensor 222, a tip holder advance command is sent to the drive mechanism 200, which then advances tip holder chain 230 in a direction "A" (clockwise in FIG. 20), which is lateral relative to the orientation of the pipette tip 290, to place a first tip holder link 232 at a second position at the tip release location 270 to capture and hold a pipette tip 290 released by the pipettor 300. As long as the waste container 220 is not in a position to receive pipette tips released by the pipettor, after a pipette tip 290 is released into the first tip holder link 232, a tip holder advance command will be sent to the drive mechanism 200 to index the tip holder chain 230 to place the next tip holder link 232 at the tip release location 270 to capture and hold the next pipette tip 290 released by pipettor 300. The drive mechanism 200 continues to advance tip holder chain 230 in direction "A" in response to the tip holder advance command, sequentially placing a tip holder link 232 at tip release location 270 to capture and hold each pipette tip 290 released by pipettor 300 while waste container 220 is not in the pipette tip-receiving position.

In an alternate embodiment, the location at which pipette tips are released into tip holders when the waste container is not positioned to receive the released pipette tips (i.e., a second tip release location) is different than the tip release location 270 (i.e., a first tip release location) at which pipette tips are released when the waste container is positioned to receive the released pipette tips. Such an embodiment would necessarily require a reconfiguration of the tip holder chain 230 (or tip holder conveyer in an embodiment that does not include a tip holder chain) so that tip holders 232 are sequentially placed at the second tip release location to capture released tips when the waste container is not positioned to receive the released pipette tips.

Figure 21:
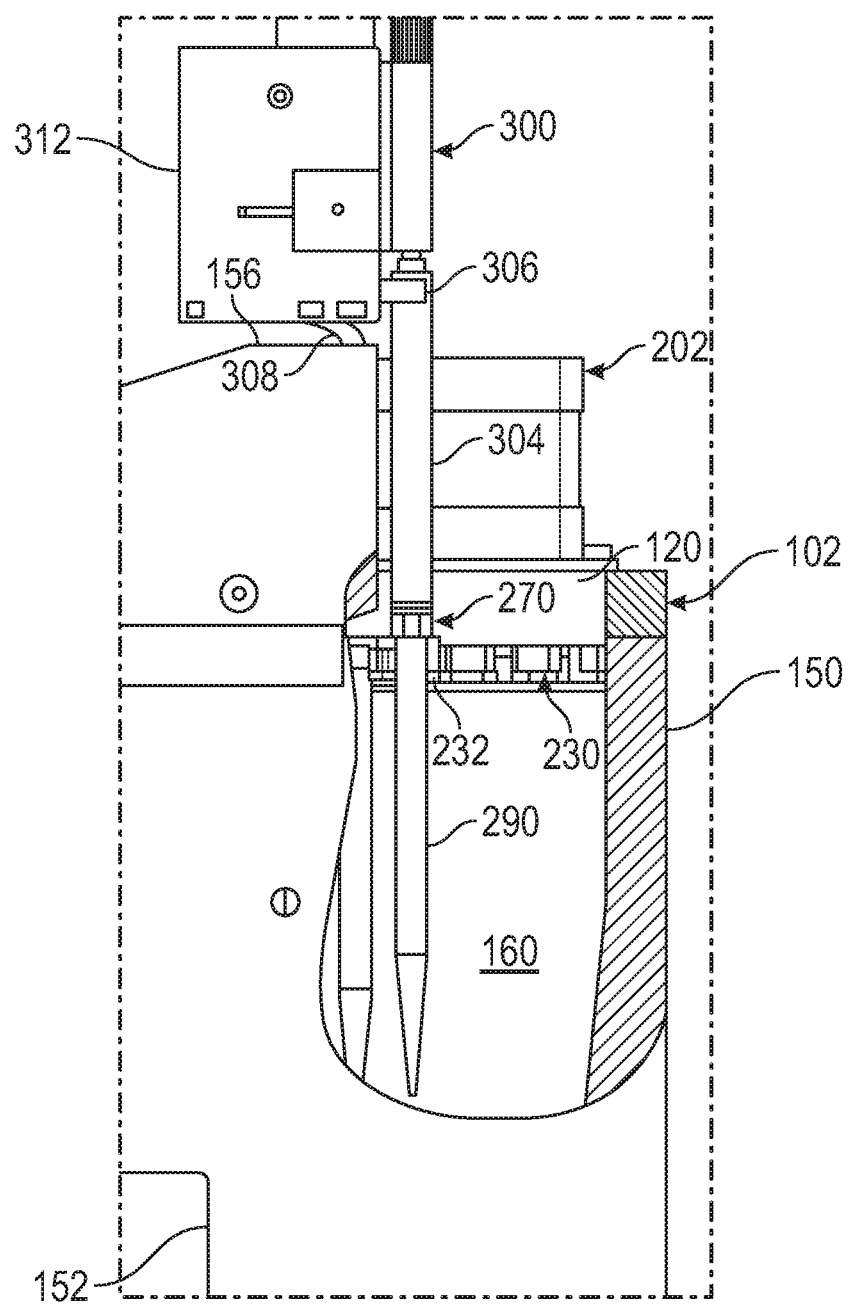
FIG. 21 is a partial cross-sectional view of the tip holding station showing the automated pipettor releasing a pipette tip into a tip holder link of the tip holder chain.

FIG. 21 is a partial cross-sectional view of tip holding station 100 showing the pipettor 300 releasing a pipette tip 290 into a tip holder link 232 of tip holder chain 230. As shown in FIG. 21, with one of the tip holder links 232 of tip holder chain 230 positioned at tip release location 270, pipettor 300 lowers pipette tip 290 into tip holder link 232. As the pipettor 300 continues to descend, release trigger 308 contacts a release surface 156 at the top of side box frame 150 of holding station 100. This causes release trigger 308 to be pushed upwardly, thereby causing release lever 306 and release sleeve 304 to move downwardly to push the pipette tip 290 off of the pipettor 300 and into the tip holder link 232 positioned at the tip release location 270.

In the embodiment shown, the pipettor 300 releases pipette tips at tip release location 270 regardless of whether the pipette tips are being released into the waste container 220 positioned to receive the released pipette tips or are being released into a tip holder of the tip holder conveyer when the waste container 220 is not positioned to receive the released pipette tips. In another embodiment, pipette tips released into the waste container positioned to receive the released pipette tips are released at a location different from the location at which pipette tips are released into a tip holder of the tip holder conveyer when the waste container is not positioned to receive the released pipette tips.

In an embodiment, a tip holder advance command to activate the drive mechanism 200 may be triggered by movement of pipettor 300 when the waste container 220 is not positioned to receive pipette tips released by the pipettor 300. After the pipettor 300 has released a pipette tip 290 and retracted to a position away from tip release location 270, drive mechanism 200 will be activated to advance tip holder chain 230 to position the next tip holder link 232 at the tip release location 270 to wait for the pipettor 300 to release another pipette tip 290. Release of the pipette tip 290 from the pipettor 300 may be detected by activation of a tip ejector, such as release sleeve 304, configured to eject a pipette tip 300 from the probe 302 (e.g., by a switch activated by release trigger 308 and/or release lever 306), or the pipette tip 290 may be at least partially electrically conductive and the pipettor 300 may be configured to detect (e.g., capacitively) the presence or absence of the pipette tip 290 on the probe 302.

In the embodiment shown, as the pipette tips 290 are captured and held by the tip holder links 232 of tip holder chain 230, the tip holder chain 230 is advanced in a lateral direction relative to the orientation of the pipette tips with the captured tips disposed behind side cover panel 160 and above lower flange 154 of side box frame 150 (see FIGS. 5 and 6). As tip holder chain 230 continues to advance, some of the tip holder links 232 and the pipette tips 290 held thereby are retained within the holding compartment 166, as shown in FIGS. 6, 7, and 20, above drip plate 168, as shown in FIG. 7. This arrangement contains any liquid that drips off of the pipette tips 290 carried on tip holder chain 230.

Figure 22:
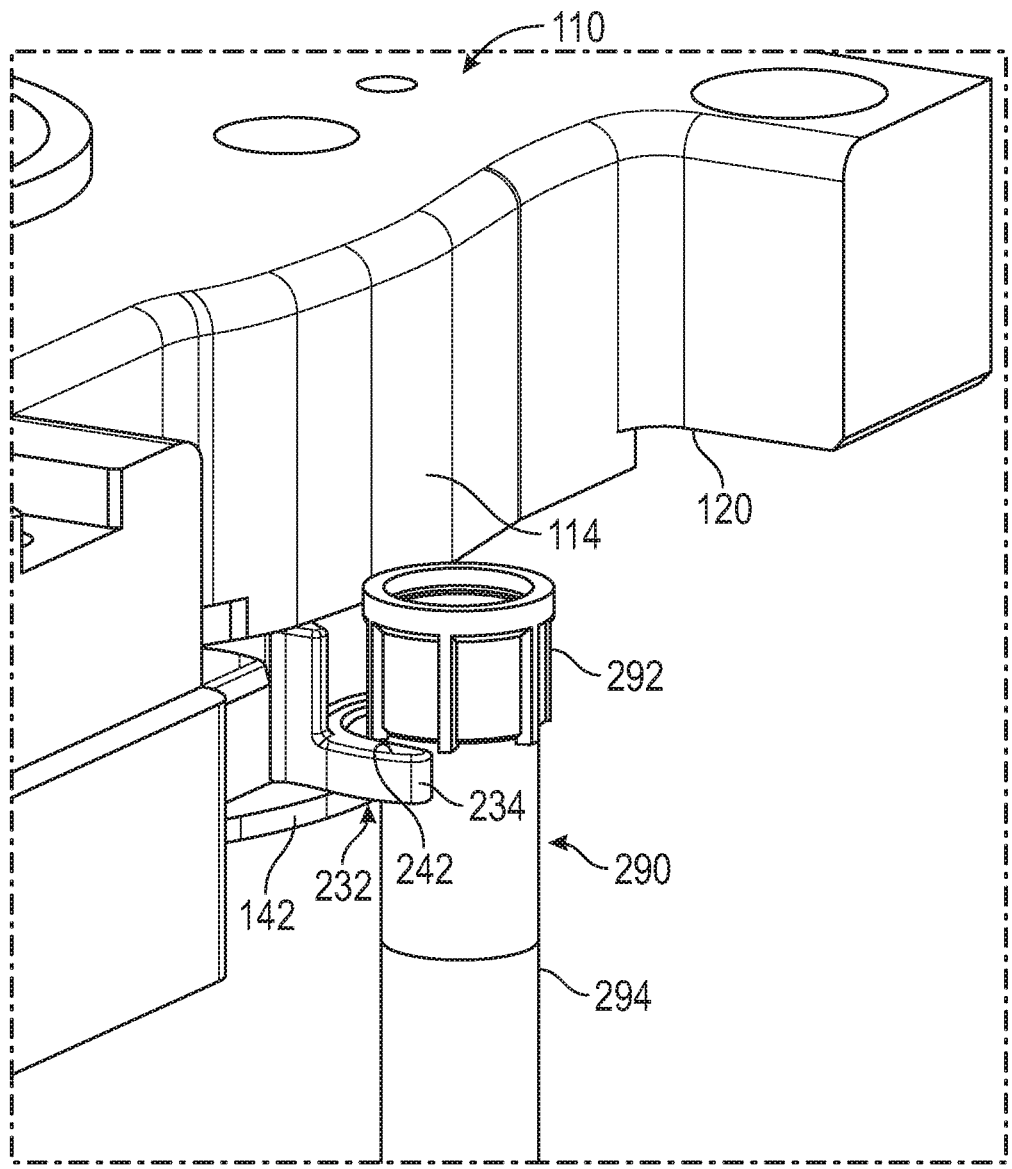
FIG. 22 is a partial perspective view of a top frame of the tip holding station showing a tip ejector and a pipette tip held in a tip holder link of the tip holder chain.

When waste container 220 is again in the pipette tip-receiving position, e.g., after the waste container 220 is replaced or after drawer 224 is closed—as detected by waste container sensor 222—pipette tips 290 held in tip holders (e.g., tip holder links 232) are transferred from the tip holding station 100 to the waste container 220. For example, pipette tips 290 held in tip holders are ejected, removed or displaced from associated tip holders at a tip removal location 165 that may be adjacent to the tip release location 270 (see FIGS. 19 and 20). In an embodiment, a tip holder reverse command causes drive mechanism 200 to reverse the direction of the tip holder chain 230 to move in a lateral direction "B" (counter-clockwise in FIG. 20). As shown in FIGS. 11-13, and as described above, the tip ejector may comprise upper tip ejector ramp 114 and lower tip ejector ramp 142. Tip ejector ramps, or wedges, 114 and 142 each comprise a sloped edge or surface, and as tip holder links 232 pass by the ramps 114, 142 in a direction of increasing outward extension, as shown in FIG. 22, the ramps 114 and 142 engage the pipette tip 290 held in tip holder link 232 and displaces or ejects the pipette tip 290 from between arms 234 and 236 (only arm 234 is visible in FIG. 22) to remove the pipette tip from the tip holder link 232.

As the tip holder chain 230 carrying one or more pipette tips 290 is moved in direction "B" with respect to the tip ejector (ramps 114, 142) each tip holder link is placed at a third position, at tip removal location 165. As the tip holder link 232 passes through the third position, each pipette tip 290 engages the tip ejector ramps 114, 142 and is laterally displaced from between arms 234 and 236 of the associated tip holder link 232 as that link passes by the tip ejector. More specifically, as shown in the embodiment of FIG. 22, upper tip ejector ramp 114 engages a portion of the collar 292 of pipette tip 290 located above the tip holder link 232, and lower tip ejector ramp 142 engages a portion of the barrel 294 of pipette tip 290 located below the tip holder link 232. The arms 234, 236 of the tip holder link 232 may be made from a flexible material, such as polyoxymethylene (POM), which is available under the trade name Delrin®. POM, also known as acetal, polyacetal, and polyformaldehyde, is an engineering thermoplastic used in precision parts requiring high stiffness, low friction, and excellent dimensional stability. It is also available, with slightly different formulas, under the trade names as Celcon®, Ramtal, Duracon®, Kepital®, and Hostaform®. In this way, as the tip ejector ramps 114, 142 engage the pipette tip 290 while the tip holder link 232 moves along the track slots 112/132 with respect to tip ejector ramps 114, 142 and pipette tip 290 is forced into the gap 238 between arms 234, 236 (see FIG. 9), arms 234, 236 flex outwardly, thereby enlarging the gap 238 so that barrel 294 of pipette tip 290 can pass through the gap 238 and the pipette tip 290 can be removed from the tip holder 232. Alternatively, arms 234, 236 may be made of a relatively inflexible material, such as aluminum, and the pipette tip 290 may be formed from a compressible material, so that as the tip ejector ramps 114, 142 engage the pipette tip 290 while the tip holder link 232 moves with respect to tip ejector ramps 114, 142 and pipette tip 290 is forced into the gap 238 between arms 234, 236 (see FIG. 9), the barrel 294 of the pipette tip 290 compresses to the width of the gap 238 so that the barrel 294 can pass through the gap 238 and the pipette tip 290 can be removed from the tip holder 232. As a further alternative, pipette tip 290 may be removed by a combination of the flexure of the arms 234, 236 and compression of the barrel 294 of the pipette tip 290.

In an alternate embodiment, the tip ejector is located at a position along the continuous path of travel of the pipette tip holder chain 230 at a position displaced in direction "A" from the tip release location 270. In such an arrangement, continued movement of the pipette tip holder chain 230 in the direction "A" causes the tip holders 232 to pass by the tip ejector, thus removing any pipette tip(s) carried by the tip holder chain 230. Thus, the pipette tips 290 are not removed from the tip holders 232 of the pipette tip holder chain 230 by reversing direction of movement of the tip holder chain but are removed by continued movement in the same direction "A" that the tip holder chain is moved while pipette tips are captured in the tip holders. As the tip removal location in such an embodiment may not be proximate the tip release location 270, an enlarged or otherwise modified waste chute may be required to direct pipette tips removed from the tip holders 232 into the waste container 220.

In an alternate embodiment, the tip ejector may comprise a single ramp that engages pipette tip 290 above or below tip holder link 232. In a further embodiment, the tip ejector comprises more than two ramps that engage pipette tip 290 at three or more locations above and/or below tip holder link 232.

The tip ejector may be located adjacent to tip release location 270 and above the lower waste chute 162, so that as the pipette tips 290 are removed from their respective tip holder links 232, the pipette tips 290 will fall through lower waste chute 162 and into waste container 220.

In the illustrated embodiment, tip holder chain 230 can capture and carry up to 22 pipette tips 290 (this is a non-limiting example; a tip holder conveyor may carry more or less than 22 pipette tips 290). It is not necessary, however, that a pipette tip 290 be captured in every available tip holder link 232. The tip holder chain 230 will be advanced in direction "A" by the drive mechanism 200 to sequentially place each tip holder link 232 at the tip release location 270 when the waste container sensor 222 detects that the waste container 220 has been removed or is otherwise not in the tip-receiving position. When waste container sensor 222 detects that the waste container 220 is again in the pipette tip-receiving position, drive mechanism 200 may reverse the direction of the tip holder chain 230 in direction "B," regardless of whether a pipette tip 290 has been captured in every tip holder link 232, to remove all of the pipette tips 290 carried by the tip holder chain 230. On the other hand, if the waste container 220 is absent for an extended period of time, and pipette tips 290 are captured in all of the tip holder links 232 before the waste container 220 is replaced, a tip holder advance command will not be sent to the drive motor 202 to move the pipette tip holder conveyor (e.g., pipette tip holder chain 230), and operation of the pipettor 300 may be interrupted until waste container 220 is returned to the pipette tip-receiving position.

As noted above, in an alternate embodiment, the tip holder chain 230 need not be a continuous chain as shown, but may be a discontinuous group of tip holders having a looped or linear arrangement of adjacently-positioned tip holders that includes means for automatically moving the arrangement to sequentially place each tip holder into a tip release location or to sequentially pass each tip holder by a tip ejector to remove pipette tips from the tip holders.

Figure 23:
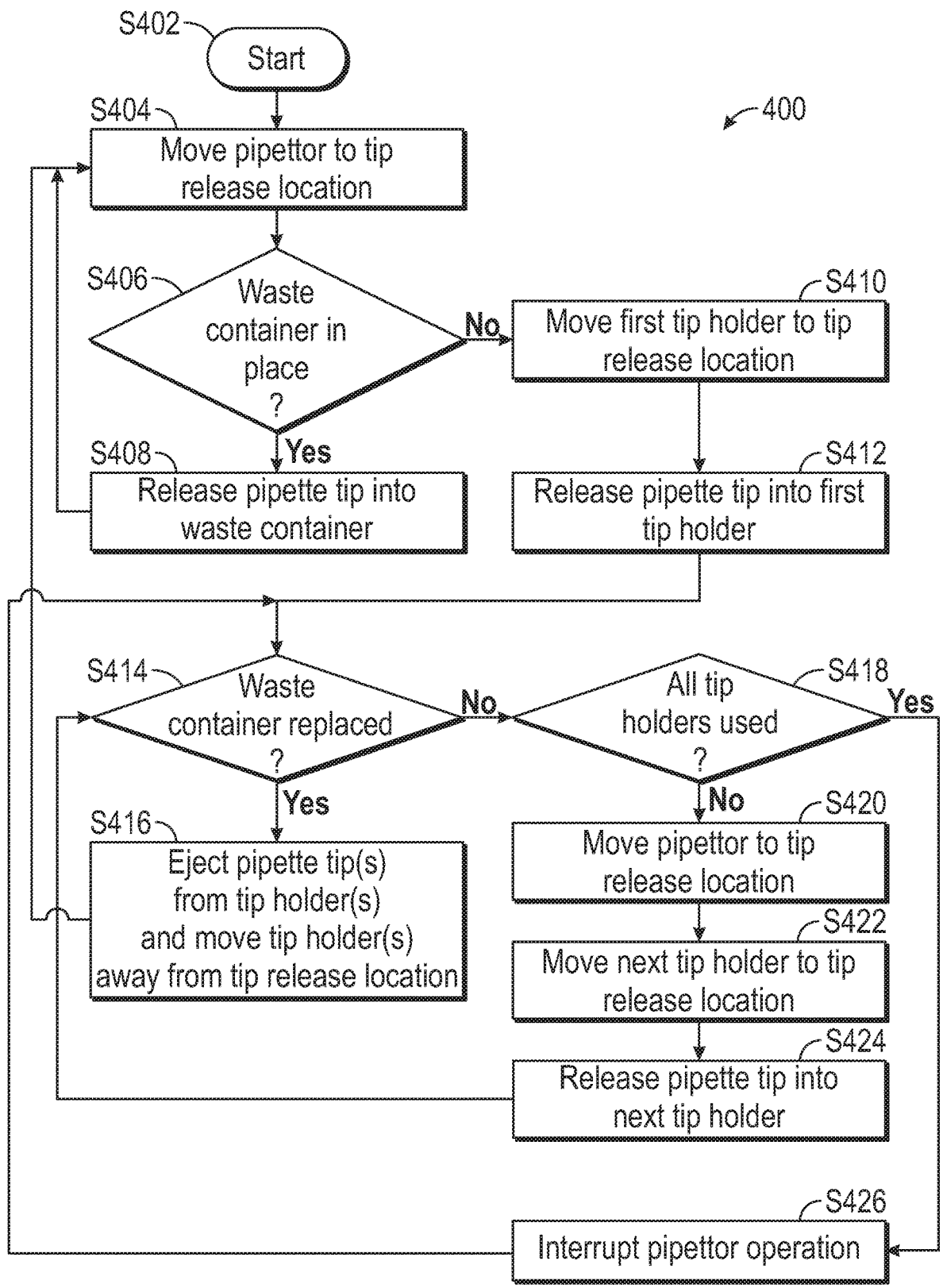
FIG. 23 is a flowchart illustrating a method for facilitating uninterrupted processing of a plurality of samples in an automated system.

FIG. 23 is a flowchart illustrating a method 400 for facilitating the uninterrupted processing of a plurality of samples in an automated system. In general, the goal of the method and apparatus is to detect whether a waste container is positioned in a pipette tip-receiving position with respect to the pipettor's pipette release location, and if the waste container is not in the pipette tip-receiving position, the pipette tips released by the pipettor are captured and retained by a pipette tip holding station to sequester them until the waste container is returned to the pipette tip-receiving position. In an embodiment, the sequestered pipette tips have been previously used for the processing of at least a subset of the plurality of samples in the system, and any pipette tips used in the processing of the plurality of samples and released from the pipettor when the waste container is in the pipette tip-receiving position, are released directly into the waste container. After the waste container is returned to the pipette tip-receiving position, the sequestered pipette tips are transferred from the pipette tip holding station to the waste container.

The method of an embodiment begins at step S402. At step S404, pipettor 300 moves to tip release location 270, as shown in FIGS. 19-21.

At step S406, it is determined whether the waste container is in place—i.e., whether the waste container is in the pipette tip receiving position. Step S406 may be performed by using sensor 222 to determine if waste container 220 is in position to receive a pipette tip 290 released by the pipettor 300 and/or if drawer 224 supporting waste container 220 is in the open or closed position.

At step S408, if the waste container is determined to be in the pipette tip-receiving position, the pipette tip 290 is released from pipettor 300 and drops through the chute 162 and into the waste container (e.g., waste container 220).

If it is determined that the waste container is not in a position to receive a pipette tip 290 released by the pipettor 300 at step S406, then a first tip holder of the tip holder conveyor is moved to the tip release position at step S410. Where the tip holder conveyor comprises tip holder chain 230, step S410 may be performed by advancing tip holder chain 230 to place the first tip holder link 232 at tip release position 270 (see FIGS. 19 and 20).

At step S412, the pipette tip 290 is released into the tip holder moved to the pipette tip release location. In an embodiment, step S412 may performed by releasing the pipette tip 290 from pipettor 300 into first tip holder link 232.

At step S414, it is determined whether the waste container has been replaced, i.e., has been returned to the pipette tip-receiving position. Step S414 may be performed by using sensor 222 to determine if waste container 220 is in position to receive a pipette tip 290 released by pipettor 300 and/or if drawer 224 supporting waste container 220 is in the open or closed position.

If it is determined that the waste container is in the pipette tip-receiving position at step S414, the one or more pipette tip(s) carried in the tip holder(s) are ejected or removed from the tip holder(s) and are allowed to drop into the waste container at step S416. The tip holders are then moved away from the tip release location. In an embodiment, step S416 is performed by moving tip holder chain 230 with respect to the tip ejector (e.g., upper and/or lower tip ejector ramps 114, 142), which engages the pipette tip(s) 290 held in the tip holder link(s) 232 to displace the pipette tip(s) 290, which then drop into waste container 220.

On the other hand, if it is determined at step S414 that the waste container has not been returned to the pipette tip-receiving position, then at step S418, it is determined if all tip holders of the tip holder conveyor have been used for holding a pipette tip released by the pipettor. In an embodiment, step S418 is performed by counting the number of tip holder links 232 that have passed through tip release location 270 and the number of pipette tips 290 that have been released by pipettor 300. The number of tip holder links 232 that have passed through tip release location 270 can be determined by a sensor disposed in sensor opening 116 of the upper track panel 110 (see FIGS. 12 and 14).

If it is determined at step S418 that not all tip holders have been used to hold a released pipette tip, then at step S420, the pipettor is moved to the tip release location. At step S422, a next tip holder is moved to the tip release location, and at step S424, a pipette tip is released by the pipettor into the next tip holder at the tip release location. Process 400 then returns to step S414.

If it is determined that all of the tip holders have been used to hold a pipette tip released by the pipettor at step S418, and no unused tip holders remain, then operation of the pipettor is interrupted at step S426, as there are no means for handling additional used pipet tips. Thus, the used pipet tips cannot be discarded until the waste container is returned to the pipette tip-receiving position. Process 400 thus returns to step S414.

Control System

Figure 24:
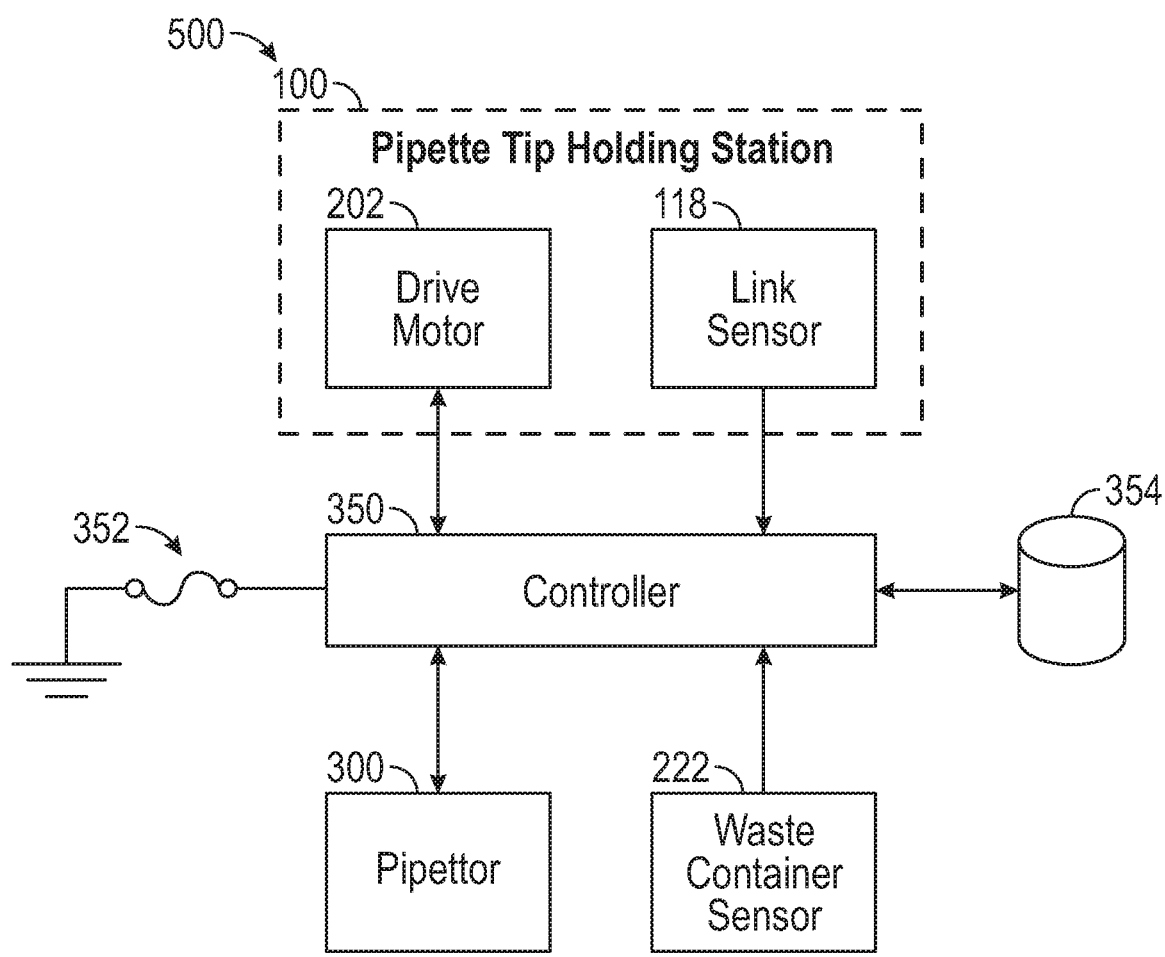
FIG. 24 is a block diagram that schematically illustrates a control architecture of the apparatus.

FIG. 24 is a block diagram that schematically illustrates control architecture for a disposable pipette tip management system 500 for controlling holding station 100. An exemplary control architecture may include a controller 350 which monitors, communicates with, and controls aspects of system 500, including drive motor 202 and a link sensor 118 (which may be disposed in sensor opening 116 formed in upper track panel 110, see FIGS. 12 and 14) of holding station 100, pipettor 300, and waste container sensor 222. The drive motor 202 of holding station 100 is coupled to and controlled by controller 350, which may also be connected to a power supply 352 that is controllable by controller 350. Controller 350 provides power and operational control signals to drive motor 202. Controller 350 may also receive data from drive motor 202 in the form of rotary encoder counts from encoders (e.g., rotary encoders) coupled to drive motor 202, as well as other feedback sensor signals.

Controller 350 may comprise a computer system for executing the control software (which may include firmware) that effects power, operation, control, and/or monitoring of holding station 100 and other components of system 500. Controller 350 may be implemented via one or more logic elements, e.g., a computer, embedded controller, programmable gate array, application specific integrated circuit, programmable logic device, etc., and may include or access data storage memory 354, which may include random access memory (RAM), read only memory (ROM), flash memory, and other types of memory now known or later developed. Controller 350 may also include additional memory, including, for example, a hard disk drive and/or a removable storage drive, representing a magnetic tape drive, an optical disk drive, USB slot, memory card interface, internet memory, cloud-based memory, or any storage medium or format now known or later developed. Memory devices and storage units used herein may comprise any storage medium for persistent and/or volatile storage of electronic data now known or later developed. Such data may be stored within the storage medium in a database, which may comprise any data structure and format now known or later developed, including, for example, a relational database, an object database, a flat file, list, and so on, or some combination thereof.

In alternative embodiments, some or all of the memory may include other similar means for allowing computer programs or other instructions to be loaded into a computer system. Such means can include, for example, a removable storage unit and an interface. Examples of such can include a memory stick and memory stick interface, a secure digital card and interface, and other portable media and interfaces which allow software and data to be transferred to controller 350.

Software comprises instructions stored on non-transitory computer-readable media which, when executed by the logic element(s) of controller 350, cause the control and computing hardware to perform one or more automated or semi-automated processes.

The computer system of controller 350 may also include a communications interface, which allows information (e.g., power, control and feedback signals, software, data, etc.) to be transferred between controller 350 and networked external devices and/or external networks. Examples of communications interfaces can include a modem, a network interface (such as an Ethernet card), a communications port, a PCMCIA slot and card, a USB-port, a Firewire port, Bluetooth, or any interface now known or later developed. Information transferred via a communications interface is in the form of signals which can be electronic, electromagnetic, optical or other signals capable of being received by the communications interface.

The computer system of controller 350 can also include one or more input devices, such as a touch screen, stylus, keyboard, mouse or other pointing device, microphone, data scanners (e.g., barcode, RFID, etc.), and so on. Various output devices may also be included in the computer system, including indicator lights, a display, printer, tactile (e.g., vibratory) indicators, and audio speakers.

As used herein, terms such as "computer program medium," "computer-readable medium," "computer usable medium," and the like are used to generally refer to media, such as removable storage units, a hard disk installed in hard disk drive, and other means for providing software and data to controller 350.

Computer programs (also called computer control logic) are stored in one or more portions of memory 354 that is part of or accessed by controller 350. Computer programs can also be received via a communications interface. Such computer programs may include algorithms, such as the algorithm 400 illustrated in FIG. 23, that, when executed, enable the computer system of controller 350 to control the operation of the system 500 in accordance with aspects disclosed herein.

In an embodiment in which aspects of the subject matter disclosed herein are implemented using software, the software may be stored in a computer program product and loaded into the computer system of controller 350 using a removable storage drive, a hard drive, an interface, and/or a communications interface. The control logic (software), when executed by the processor of controller 350, causes the processor to perform functional aspects of the subject matter as described herein via the systems, devices, apparatuses, sensors, encoder, etc. described above. An operating system may perform basic tasks such as recognizing input from an input device, sending output to an output device, managing files and system resources, and managing the various processes embodying computer programs running on the computer system.

Controller 350 may comprise a stand-alone system dedicated to system 500 or holding station 100 (e.g., in printed circuit board 280, see FIG. 4), or one or more components of controller 350—e.g., processor, memory, interfaces, input/output devices, etc.—may be a shared part of a global controller that controls one or more components of an instrument, such as instrument 225, or laboratory of which system 500 is a part, in addition to the system 500.

As shown schematically in FIG. 24, with respect to pipette tip holding station 100, controller 350 receives signals from drive motor 202 and link sensor 118 and sends signals to drive motor 202. Controller 350 may also receive signals from and send signals to pipettor 300 and may receive signals from waste container sensor 222. For example, controller 350 may send control signals to pipettor 300 to move to the pipette tip release location 270 and to lower the pipettor arm 310 until the release trigger 308 contacts the release surface 156 (see FIG. 21). Controller 350 may send a signal to pipettor 300 to move from the pipette release location 270 after the pipette tip 290 is released. Controller 350 may receive signals from waste container sensor 222 indicating whether the waste container 220 is in a pipette tip-receiving position and/or indicating whether a drawer 224 supporting the waste container 220 is in an open or closed position. (see FIGS. 1-4). Upon receiving a signal from the waste container sensor 222 that the waste container 220 is not in the pipette tip-receiving position, controller 350 will send signals (a tip holder advance command) to the drive motor 202 to move the pipette tip holder conveyor (e.g., pipette tip holder chain 230) to move a tip holder into the pipette tip release position. Signals from the motor 202 and/or signals from link sensor 118 to the controller 350 allow the controller 350 to control the drive motor 202 to properly position a tip holder at the tip release location. When controller 350 receives a signal from the pipettor 300 that a pipette tip 290 has been released, controller 350 may send a signal (a tip holder advance command) to drive motor 202 to move the next tip holder into position at the pipette tip release location. If signals received by the controller 350 from the link sensor 118 indicate that all tip holders have been moved to the pipette tip release location, a signal from the controller 350 to the pipettor 300 may interrupt operation of the pipettor 300. Upon receiving a signal from the waste container sensor 222 that the waste container 220 is in the pipette tip-receiving position, controller 350 will send signals to the drive motor 202 (e.g., a tip holder reverse command) to move the pipette tip holder conveyor (e.g., pipette tip holder chain 230) to the standby position. As the pipette tip holder conveyor moves toward the standby position, the tip holder(s) that have received a pipette tip move by the tip ejector, and the pipette tips carried thereby are removed from the tip holder(s) by the tip ejector.

Embodiments

Embodiment 1. A device to capture one or more pipette tips that are released from an automated pipettor at a tip release location, the device comprising:

a tip holder conveyor comprising or supporting a plurality of tip holders, each tip holder being configured to receive and releasably hold a single pipette tip;

a drive mechanism configured to index the tip holder conveyor to sequentially place each of one or more of the plurality of tip holders in the tip release location to receive a pipette tip released by the automated pipettor into each tip holder placed at the tip release location; and a tip ejector positioned to engage a pipette tip held in each of one or more of the plurality of tip holders when the tip holder conveyor is moved by the drive mechanism with respect to the tip ejector, the tip ejector being configured to remove each pipette tip that it engages from an associated tip holder.

Embodiment 2. The device of embodiment 1, wherein the plurality of tip holders of the tip holder conveyor are interconnected to form a tip holder chain.

Embodiment 3. The device of embodiment 2, wherein the tip holder chain comprises a continuous chain guided by a continuous track.

Embodiment 4. The device of any one of embodiments 1 to 3, wherein, after a pipette tip is released by the automated pipettor into the tip holder located at the tip release location, if at least one of the plurality of tip holders has not received a pipette tip released by the automated pipettor, the drive mechanism indexes the tip holder conveyor to index a following tip holder to the tip release location.

Embodiment 5. The device of any one of embodiments 1 to 4, wherein pipette tips released from the automated pipettor will drop into a removable waste container positioned to receive the released pipette tips when there is no tip holder located at the tip release location, and wherein the device further comprises a waste container sensor configured to detect if the waste container is positioned to receive the released pipette tips, whereby detection by the waste container sensor that the waste container is not positioned to receive the released pipette tips causes the drive mechanism to index the tip holder conveyor to sequentially position each of the one or more tip holders at the tip release location to capture each pipette tip released while the waste container is not positioned to receive the released pipette tips, and detection by the waste container sensor that the waste container is positioned to receive the released pipette tips causes the drive mechanism to move the tip holder conveyor to sequentially move each of the one or more tip holders with respect to the tip ejector to remove the pipette tips from the associated tip holders at a tip removal location.

Embodiment 6. The device of embodiment 5, further comprising a waste chute positioned beneath the tip release location and beneath the tip removal location, wherein the waste chute is configured to direct pipette tips released by the automated pipettor or pipette tips removed from tip holders of the tip holder conveyor into the waste container.

Embodiment 7. The device of embodiment 5, wherein the drive mechanism is configured to move the tip holder conveyor to a standby position at which no tip holder is located at the tip release location when the waste container sensor detects that the waste container is positioned to receive the released pipette tips.

Embodiment 8. The device of embodiment 7, wherein, as the tip holder conveyor is moved to the standby position, each tip holder holding a pipette tip is sequentially moved with respect to the tip ejector to remove the pipette tip from the associated tip holder, so that no pipette tips are held by the tip holder conveyor when the tip holder conveyor is in the standby position.

Embodiment 9. The device of any one of embodiments 1 to 8, wherein the tip holder conveyor comprises a tip holder chain comprising a plurality of interconnected links, and wherein each tip holder is part of one of the links.

Embodiment 10. The device of any one of embodiments 1 to 8, wherein the tip holder conveyor includes a detect element at each tip holder, and the device further includes a sensor for detecting each detect element that passes the sensor as the drive mechanism moves the tip holder conveyor.

Embodiment 11. The device of embodiment 10, wherein the tip holder conveyor comprises a tip holder chain comprising a plurality of interconnected links, and each tip holder is part of one of the links and each detect element comprises a pin connecting one link to an adjacent link.

Embodiment 12. The device of embodiment 11, further comprising a controller configured to determine the position of the tip holder chain based on the number of detect elements that have passed the sensor.

Embodiment 13. The device of embodiment 11 or 12, wherein the tip holder chain comprises a continuous chain guided by a continuous track.

Embodiment 14. The device of embodiment 13, wherein the drive mechanism comprises a chain drive comprising a motorized wheel, and the continuous chain is trained around the motorized wheel.

Embodiment 15. The device of any one of embodiments 1 to 14, wherein each tip holder comprises a clip defining an opening configured to receive a pipette tip without any resistance.

Embodiment 16. The device of embodiment 15, wherein each clip comprises opposed arms configured to hold a pipette tip therebetween and defining a lateral opening that is less than the width of a portion of the pipette tip held between the opposed arms.

Embodiment 17. The device of embodiment 16, wherein the tip ejector comprises one or more ramps that contact a pipette tip held in the opening of the clip as the tip holder passes by the tip ejector, and wherein the opposed arms are flexible so that as the one or more ramps contact the pipette tip, the pipette tip is moved laterally and urges the opposed arms apart to enlarge the lateral opening and permit the pipette tip to pass through the lateral opening and be removed from the tip holder.

Embodiment 18. The device of embodiment 17, wherein the tip holder conveyor follows a curved path adjacent the tip ejector.

Embodiment 19. The device of embodiment 17 or 18, wherein the tip ejector comprises first and second laterally extending ramps, wherein the first laterally extending ramp is configured to engage a first portion of the pipette tip extending above the clip as the tip holder moves with respect to the tip ejector, and the second laterally extending ramp is configured to engage a second portion of the pipette tip extending below the clip as the tip holder moves with respect to the tip ejector.

Embodiment 20. The device of any one of embodiments 1 to 19, wherein the drive mechanism is configured to move the tip holder conveyor in a first direction to sequentially place each tip holder at the tip release location and is configured to move the tip holder conveyor in a second direction opposite the first direction to move the tip holder conveyor with respect to the tip ejector to remove the pipette tips from the associated tip holders.

Embodiment 21. The device of embodiment 20, wherein at least a portion of the tip holder conveyor follows a linear path when moving in the first and second directions.

Embodiment 22. An instrument comprising:

a pipettor configured for lateral and vertical movement in the instrument, the pipettor having a mounting end adapted to receive a pipette tip in a frictional fit;

a waste container moveable between a first receptacle position and a second receptacle position, wherein the waste container is positioned to receive a pipette tip released from the mounting end of the pipettor at a tip release location when the waste container is in the first receptacle position, and wherein the waste container is not positioned to receive a pipette tip released from the mounting end of the pipettor at the tip release location when the waste container is in the second receptacle position; and a pipette tip holder moveable between a first tip holder position and a second tip holder position, wherein, in the first tip holder position, the pipette tip holder is not positioned to receive a pipette tip released from the mounting end of the pipettor at the tip release location when the waste container is in the first receptacle position, and wherein, in the second tip holder position, the pipette tip holder is positioned to receive and hold a pipette tip released from the mounting end of the pipettor at the tip release location when the waste container is in the second receptacle position.

Embodiment 23. The instrument of embodiment 22, wherein the pipettor is configured for X, Y, and Z movement.

Embodiment 24. The instrument embodiment 22 or 23, wherein the pipettor comprises a probe, and wherein the mounting end comprises a distal end of the probe.

Embodiment 25. The instrument of any one of embodiments 22 to 24, further comprising a pipette tip holder bay and a container of pipette tips disposed within the pipette tip holder bay, wherein the pipette tips in the container within the pipette tip holder bay are positioned and oriented to be engaged by the mounting end of the pipettor.

Embodiment 26. The instrument of any one of embodiments 22 to 25, wherein the pipette tip holder is movable to a third tip holder position different than the second tip holder position where a pipette tip held in the pipette tip holder is removed from the pipette tip holder.

Embodiment 27. The instrument of embodiment 26, further comprising a tip ejector configured to remove the pipette tip from the pipette tip holder at the third position.

Embodiment 28. The instrument of embodiment 27, wherein the pipette tip is laterally displaced from the pipette tip holder by the tip ejector.

Embodiment 29. The instrument of any one of embodiments 26 to 28, wherein movement of the pipette tip holder from the first tip holder position to the second tip holder position is in a first lateral direction, and movement of the pipette tip holder from the second tip holder position to the third tip holder position is in a second lateral direction, the first and second lateral directions being opposite directions.

Embodiment 30. The instrument of any one of embodiments 22 to 29, wherein the waste container is lined with a disposable plastic bag.

Embodiment 31. The instrument of any one of embodiments 22 to 30, further comprising a drawer supporting the waste container, wherein the drawer is configured to move the waste container laterally between the first and second receptacle positions.

Embodiment 32. The instrument of any one of embodiments 22 to 31, further comprising a sensor for sensing when the waste container is in at least one of the first and second receptacle positions.

Embodiment 33. The instrument of any one of embodiments 22 to 32, wherein the pipette tip holder is carried on a conveyor.

Embodiment 34. The instrument of embodiment 33, further comprising a track for supporting the conveyor.

Embodiment 35. The instrument of embodiment 34, further comprising a sensor for monitoring the position of the pipette tip holder on the track.

Embodiment 36. The instrument of any one of embodiments 33 to 35, further comprising a drip tray situated beneath a portion of the conveyor.

Embodiment 37. The instrument of any one of embodiments 22 to 36, wherein the pipette tip holder is one of a plurality of pipette tip holders.

Embodiment 38. The instrument of any one of embodiments 22 to 37, wherein a pipette tip is released into the waste container when the pipette tip holder is not in the second tip holder position for receiving the pipette tip released from the mounting end of the pipettor at the tip release location and the waste container is in the first receptacle position.

Embodiment 39. The instrument of embodiment 38, wherein the pipette tip is released into a chute that directs the pipette tip into the waste container when a pipette tip holder is not in the second tip holder position for receiving the pipette tip released from the mounting end of the pipettor at the tip release location and the waste container is in the first receptacle position.

Embodiment 40. The instrument of any one of embodiments 22 to 39, wherein the tip holder comprises a clip defining an opening configured to receive a pipette tip without any resistance.

Embodiment 41. The instrument of embodiment 40, wherein the clip comprises opposed arms configured to hold a pipette tip therebetween and defining a lateral opening that is less than the width of a portion of the pipette tip held between the opposed arms.

Embodiment 42. The instrument of any one of embodiments 22 to 41, wherein the pipettor includes a tip release mechanism for releasing the pipette tip from the mounting end of the pipettor.

Embodiment 43. The instrument of embodiment 42, wherein the tip release mechanism comprises a release sleeve coaxially mounted over the mounting end and configured to be movable in an axial direction with respect to the mounting end.

Embodiment 44. The instrument of embodiment 43, wherein the tip release mechanism further comprises a release trigger coupled to the release sleeve and configured to cause the release sleeve to move axially with respect to the mounting end to release a pipette tip from the mounting end when the pipettor moves the release trigger into contact with a release surface.

Embodiment 45. A method for capturing one or more pipette tips that are released from an automated pipettor, the method comprising:

a) repeatedly moving the pipettor with a pipette tip secured thereto laterally to a tip release position and releasing the pipette tip from the pipettor, whereby the released pipette tip drops into a waste container positioned to receive the released pipette tip;

b) detecting if the waste container is no longer positioned to receive a pipette tip released from the pipettor at the tip release position; and c) upon detecting that the waste container is no longer positioned to receive a pipette tip released from the pipettor at the tip release position, moving a pipette tip holder from a first tip holder position in which the pipette tip holder is not positioned to receive a pipette tip released from the pipettor at the tip release position to a second tip holder position at which the pipette tip holder is positioned to receive a pipette tip released from the pipettor at the tip release position, and receiving a pipette tip released from the pipettor with the pipette tip holder at the second tip holder position.

Embodiment 46. The method of embodiment 45, further comprising:

d) while the waste container is no longer positioned to receive a pipette tip released from the pipettor at the tip release position, moving additional pipette tip holders from the first tip holder position in which the pipette tip holder is not positioned to receive a pipette tip released from the pipettor at the tip release position to the second tip holder position at which the pipette tip holder is positioned to receive a pipette tip released from the pipettor at the tip release position, and e) receiving the pipette tip released from the pipettor with an associated pipette tip holder at the second tip holder position.

Embodiment 47. The method of embodiment 45 or 46, wherein step b) is performed with a sensor for detecting the presence or absence of the waste container.

Embodiment 48. The method of any one of embodiments 45 to 47, further comprising, after step c):

upon detecting that the waste container is positioned to receive a pipette tip from the pipettor at the tip release position, moving the pipette tip holder from the second tip holder position to a third tip holder position that is different from the second tip holder position; and g) at the third tip holder position, removing a pipette tip from the pipette tip holder, whereby the removed pipette tip drops into the waste container.

Embodiment 49. The method of embodiment 48, wherein step g) comprises moving the pipette tip holder with respect to a tip ejector comprising at least one ramp that engages a pipette tip held in the tip holder and displaces the pipette tip laterally out of the tip holder.

Embodiment 50. The method of any one of embodiments 45 to 49, wherein a plurality of tip holders are interconnected to form a continuous tip holder chain, and step f) comprises moving the tip holder chain with a motorized drive wheel engaged with the tip holder chain.

Embodiment 51. The method of any one of embodiments 48 to 50, wherein step c) comprises moving the pipette tip holder in a first lateral direction, and step f) comprises moving the pipette tip holder in a second lateral direction, the first and second lateral directions being opposite directions.

Embodiment 52. The method of any one of embodiments 45 to 51, further comprising:

h) monitoring a position of the pipette tip holder.

Embodiment 53. The method of any one of embodiments 45 to 52, further comprising:

i) determining that no pipette tip holders without a pipette tip are available; and interrupting operation of the pipettor when no pipette tip holders without a pipette tip are available.

Embodiment 54. The method of any one of embodiments 45 to 53, wherein releasing the pipette tip from the pipettor comprises engaging a pipette tip attached to the pipettor with a tip release mechanism.

Embodiment 55. The method of embodiment 54, wherein the tip release mechanism comprises a release sleeve coaxially mounted over a mounting end of the pipettor on which the pipette tip is attached, and wherein engaging the pipette tip with the tip release mechanism comprises moving the release sleeve in an axial direction with respect to the mounting end.

Embodiment 56. The method of embodiment 55, wherein the tip release mechanism further comprises a release trigger coupled to the release sleeve and wherein moving the release sleeve axially with respect to the mounting end comprises contacting a release surface with the release trigger.

Embodiment 57. A method for facilitating the uninterrupted processing of a plurality of samples in an automated system, the method comprising the steps of:

a) detecting that a waste container of the system is not in a pipette tip-receiving position;

b) after step a), and while the waste container is not in the pipette tip-receiving position, sequestering one or more pipette tips released from a pipettor in a pipette tip holding station of the system, the sequestered pipette tips having been previously used for the processing of at least a subset of the plurality of samples in the system, wherein any pipette tips used in the processing of the plurality of samples and released from the pipettor when the waste container is in the pipette tip-receiving position, are released directly into the waste container;

c) after step b), detecting that the waste container is in the pipette tip-receiving position; and d) after step c), and while the waste container is in the pipette tip-receiving position, transferring the sequestered pipette tips from the pipette tip holding station to the waste container, wherein the processing of the plurality of samples in the system is uninterrupted during steps a) to d).

Embodiment 58. The method of embodiment 57, wherein the waste container is supported by a drawer that is movable in a lateral direction to or from the pipette tip-receiving position.

Embodiment 59. The method of embodiment 57 or 58, wherein the waste container is lined with a disposable plastic bag.

Embodiment 60. The method of any one of embodiments 57 to 59, wherein steps a) and b) comprise detecting when the waste container is or is not in the pipette tip-receiving position using a positional sensor of the system.

Embodiment 61. The method of any one of embodiments 57 to 60, wherein step b) comprises, for each of the one or more pipette tips, moving the pipettor into engagement with a pipette tip release surface of the holding station, thereby causing the pipettor to release the associated pipette tip from a mounting end of the pipettor.

Embodiment 62. The method of any one of embodiments 57 to 61, wherein the one or more pipette tips are released into individual pipette tip holders at a first tip release location in step b), the individual pipette tip holders being contained within the pipette tip holding station when the waste container is not in the pipette tip-receiving position.

Embodiment 63. The method of embodiment 62, wherein the pipette tip holders support the one or more pipette tips in an upright orientation.

Embodiment 64. The method of embodiment 62 or 63, wherein the individual pipette tip holders comprise or are supported by a looped conveyor of the pipette tip holding station.

Embodiment 65. The method of embodiment 64, wherein the individual pipette tip holders are moved in a first lateral direction on the conveyor during step b) and in a second lateral direction on the conveyor in step d), the first lateral direction and the second lateral direction being opposite directions.

Embodiment 66. The method of any one of embodiments 62 to 65, wherein step d) comprises laterally displacing the one or more pipette tips from the individual pipette tip holders.

Embodiment 67. The method of any one of embodiments 62 to 66, further comprising the step of releasing at least one pipette tip from the pipettor at a second tip release location when the waste container is in the pipette tip-receiving position.

Embodiment 68. The method of embodiment 67, wherein the first and second tip release locations are the same tip release location.

Embodiment 69. The method of embodiment 67 or 68, wherein the first and second tip release locations are situated above a chute for directing pipette tips to the waste container.

Embodiment 70. The method of any one of embodiments 57 to 69, further comprising the step of collecting a residual fluid dislodged from at least one of the one or more pipette tips in a tray disposed beneath the one or more pipette tips sequestered in the holding station in step b), the tray being a component of the holding station.

Embodiment 71. The method of any one of embodiments 57 to 70, wherein the processing of at least a subset of the plurality of samples includes reconstituting or transferring a reagent for performing a nucleic acid-based amplification reaction.

Embodiment 72. The method of any one of embodiments 57 to 71, wherein the processing of at least a subset of the plurality of samples includes forming a reaction mixture comprising one of the samples and at least one reagent for performing a nucleic acid-based amplification reaction.

While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations is not intended to convey that the claimed subject matter requires features or combinations of features other than those expressly recited in the claims. Accordingly, the scope of this disclosure is intended to include all modifications and variations encompassed within the spirit and scope of the following appended claims.

The invention claimed is:

1. A device to capture one or more pipette tips that are released from an automated pipettor at a tip release location, the device comprising:
a tip holder conveyor comprising or supporting a plurality of tip holders, each tip holder being configured to receive and releasably hold a single pipette tip, wherein pipette tips released from the automated pipettor will drop into a removable waste container positioned to receive the released pipette tips when there is no tip holder located at the tip release location;
a drive mechanism configured to index the tip holder conveyor to sequentially place each of one or more of the plurality of tip holders at the tip release location to receive a pipette tip released by the automated pipettor into each tip holder placed at the tip release location;
a tip ejector positioned to engage a pipette tip held in each of one or more of the plurality of tip holders when the tip holder conveyor is moved by the drive mechanism with respect to the tip ejector, the tip ejector being configured to remove each pipette tip that it engages from an associated tip holder; and
a waste container sensor configured to detect if the waste container is positioned to receive the released pipette tips, whereby detection by the waste container sensor that the waste container is not positioned to receive the released pipette tips causes the drive mechanism to index the tip holder conveyor to sequentially position each of the one or more tip holders at the tip release location to capture each pipette tip released while the waste container is not positioned to receive the released pipette tips, and detection by the waste container sensor that the waste container is positioned to receive the released pipette tips causes the drive mechanism to move the tip holder conveyor to sequentially move each of the one or more tip holders with respect to the tip ejector to remove the pipette tips from the associated tip holders at a tip removal location.

2. The device of claim 1, wherein the plurality of tip holders of the tip holder conveyor are interconnected to form a tip holder chain, and wherein the tip holder chain comprises a continuous chain guided by a continuous track.

3. The device of claim 1, wherein, after a pipette tip is released by the automated pipettor into the tip holder located at the tip release location, if at least one of the plurality of tip holders has not received a pipette tip released by the automated pipettor, the drive mechanism indexes the tip holder conveyor to index a following tip holder to the tip release location.

4. The device of claim 1, further comprising a waste chute positioned beneath the tip release location and beneath the tip removal location, wherein the waste chute is configured to direct pipette tips released by the automated pipettor or pipette tips removed from tip holders of the tip holder conveyor into the waste container.

5. The device of claim 1, wherein the drive mechanism is configured to move the tip holder conveyor to a standby position at which no tip holder is located at the tip release location when the waste container sensor detects that the waste container is positioned to receive the released pipette tips.

6. The device of claim 5, wherein, as the tip holder conveyor is moved to the standby position, each tip holder holding a pipette tip is sequentially moved with respect to the tip ejector to remove the pipette tip from the associated tip holder, so that no pipette tips are held by the tip holder conveyor when the tip holder conveyor is in the standby position.

7. The device of claim 1, wherein the tip holder conveyor comprises a tip holder chain comprising a plurality of interconnected links, and wherein each tip holder is part of one of the links.

8. The device of claim 1, wherein the tip holder conveyor includes a detect element at each tip holder, and the device further includes a sensor for detecting each detect element that passes the sensor as the drive mechanism moves the tip holder conveyor.

9. The device of claim 8, wherein the tip holder conveyor comprises a tip holder chain comprising a plurality of interconnected links, and each tip holder is part of one of the links and each detect element comprises a pin connecting one link to an adjacent link.

10. The device of claim 9, further comprising a controller configured to determine the position of the tip holder chain based on the number of detect elements that have passed the sensor.

11. The device of claim 9, wherein the tip holder chain comprises a continuous chain guided by a continuous track.

12. The device of claim 11, wherein the drive mechanism comprises a chain drive comprising a motorized wheel, and the continuous chain is trained around the motorized wheel.

13. The device of claim 1, wherein each tip holder comprises a clip defining an opening configured to receive a pipette tip without any resistance.

14. The device of claim 13, wherein each clip comprises opposed arms configured to hold a pipette tip therebetween and defining a lateral opening that is less than the width of a portion of the pipette tip held between the opposed arms.

15. The device of claim 14, wherein the tip ejector comprises one or more ramps that contact a pipette tip held in the opening of the clip as the tip holder passes by the tip ejector, and wherein the opposed arms are flexible so that as the one or more ramps contact the pipette tip, the pipette tip is moved laterally and urges the opposed arms apart to enlarge the lateral opening and permit the pipette tip to pass through the lateral opening and be removed from the tip holder.

16. The device of claim 15, wherein the tip holder conveyor follows a curved path adjacent the tip ejector.

17. The device of claim 15, wherein the tip ejector comprises first and second laterally extending ramps, wherein the first laterally extending ramp is configured to engage a first portion of the pipette tip extending above the clip as the tip holder moves with respect to the tip ejector, and the second laterally extending ramp is configured to engage a second portion of the pipette tip extending below the clip as the tip holder moves with respect to the tip ejector.

18. The device of claim 1, wherein the drive mechanism is configured to move the tip holder conveyor in a first direction to sequentially place each tip holder at the tip release location and is configured to move the tip holder conveyor in a second direction opposite the first direction to move the tip holder conveyor with respect to the tip ejector to remove the pipette tips from the associated tip holders.

19. The device of claim 18, wherein at least a portion of the tip holder conveyor follows a linear path when moving in the first and second directions.

\* \* \* \* \*

UNITED STATES PATENT AND TRADEMARK OFFICE
CERTIFICATE OF CORRECTION

| | | |
|---|---|---|
| PATENT NO. | : 12,332,264 B2 | Page 1 of 1 |
| APPLICATION NO. | : 17/599273 | |
| DATED | : June 17, 2025 | |
| INVENTOR(S) | : David H. Combs et al. | |

It is certified that error appears in the above-identified patent and that said Letters Patent is hereby corrected as shown below:

On the Title Page

In Item (72), under "Inventors", in Column 1, Line 1, delete "H" and insert -- H. --, therefor.

In the Specification

In Column 10, Line 52, delete "be is" and insert -- be --, therefor.

In Column 27, Line 9, delete "upon" and insert -- f) upon --, therefor.

In Column 27, Line 40, delete "interrupting" and insert -- j) interrupting --, therefor.

Signed and Sealed this
Twenty-sixth Day of August, 2025

Coke Morgan Stewart
*Acting Director of the United States Patent and Trademark Office*